US012187052B2

(12) United States Patent
Wanibe et al.

(10) Patent No.: US 12,187,052 B2
(45) **Date of Patent: *Jan. 7, 2025**

(54) MEDIUM-TRANSPORT APPARATUS AND MEDIUM-TRANSPORT SYSTEM

(71) Applicant: SEIKO EPSON CORPORATION, Tokyo (JP)

(72) Inventors: Akihisa Wanibe, Matsumoto (JP); Hironori Matsuoka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,571

(22) Filed: Oct. 25, 2023

(65) Prior Publication Data

US 2024/0051318 A1 Feb. 15, 2024

Related U.S. Application Data

(63) Continuation of application No. 17/653,403, filed on Mar. 3, 2022, now Pat. No. 11,827,040.

(30) Foreign Application Priority Data

Mar. 5, 2021 (JP) ................................ 2021-035083

(51) Int. Cl.

| | |
|---|---|
| ***B41J 29/13*** | (2006.01) |
| ***B41J 13/00*** | (2006.01) |
| ***B41J 13/10*** | (2006.01) |
| ***B41J 29/02*** | (2006.01) |

(Continued)

(52) U.S. Cl.

CPC ............. *B41J 29/13* (2013.01); *B41J 13/009* (2013.01); *B41J 13/103* (2013.01); *B41J 29/02* (2013.01);

(Continued)

(58) Field of Classification Search

CPC ........ B41J 29/13; B41J 13/009; B41J 13/103; B41J 29/02; B65H 1/266; B65H 5/066;

(Continued)

(56) References Cited

U.S. PATENT DOCUMENTS

| | | | |
|---|---|---|---|
| 9,254,694 | B2 | 2/2016 | Tanjo et al. |
| 11,207,905 | B2 | 12/2021 | Matsuo et al. |

(Continued)

FOREIGN PATENT DOCUMENTS

| | | |
|---|---|---|
| CN | 101571683 | 11/2009 |
| JP | H08-002753 | 1/1996 |

(Continued)

*Primary Examiner* — Henok D Legesse

(74) *Attorney, Agent, or Firm* — WORKMAN NYDEGGER

(57) ABSTRACT

A medium-transport apparatus includes: an apparatus main body having the transport path for transporting the medium; and a cover CV provided on the side surface of the apparatus main body and configured to be switched between a first state of exposing the transport path and a second state of covering the transport path. The cover CV is divided into: a first cover that has the rotation shaft along a Z-axis and is rotatable with respect to the apparatus main body; and a second cover that is arranged on a −Z side of the first cover, has the rotation shaft along a Y-axis on the Z-side, and is rotatable with respect to the apparatus main body.

18 Claims, 10 Drawing Sheets

(51) Int. Cl.

| | |
|---|---|
| ***B65H 1/26*** | (2006.01) |
| ***B65H 5/06*** | (2006.01) |
| ***B65H 5/38*** | (2006.01) |

(52) U.S. Cl.

CPC ............. *B65H 1/266* (2013.01); *B65H 5/066* (2013.01); *B65H 5/38* (2013.01); *B65H 2402/10* (2013.01); *B65H 2402/45* (2013.01); *B65H 2404/611* (2013.01); *B65H 2404/63* (2013.01); *B65H 2407/21* (2013.01); *B65H 2601/11* (2013.01); *B65H 2701/1131* (2013.01); *B65H 2801/06* (2013.01)

(58) Field of Classification Search

CPC .. B65H 5/38; B65H 2402/10; B65H 2402/45; B65H 2404/611; B65H 2404/63; B65H 2407/21; B65H 2601/11; B65H 2701/1131; B65H 2801/06

See application file for complete search history.

(56) References Cited

U.S. PATENT DOCUMENTS

| | | | | |
|---|---|---|---|---|
| 11,827,040 | B2 * | 11/2023 | Wanibe .................... | B41J 29/13 |
| 2015/0273891 | A1 | 10/2015 | Tanjo et al. | |
| 2018/0178561 | A1 | 6/2018 | Nishiyama et al. | |
| 2019/0243300 | A1 | 8/2019 | Matsuo | |

FOREIGN PATENT DOCUMENTS

| | | |
|---|---|---|
| JP | 2001-031336 | 2/2001 |
| JP | 2001-130759 | 5/2001 |
| JP | 2014-026078 | 2/2014 |
| JP | 2017-024822 | 2/2017 |
| JP | 2018-030726 | 3/2018 |
| JP | 2018-104197 A | 7/2018 |
| JP | 2019-136915 | 8/2019 |

* cited by examiner

MEDIUM-TRANSPORT APPARATUS AND MEDIUM-TRANSPORT SYSTEM

The present application is a Continuation of U.S. application Ser. No. 17/653,403, filed Mar. 3, 2022, which is based on, and claims priority from JP Application Serial Number 2021-035083, filed Mar. 5, 2021, the disclosures of which are hereby incorporated by reference herein in their entirety.

BACKGROUND

1. Technical Field

The present disclosure relates to a medium-transport apparatus and a medium-transport system for transporting a medium.

2. Related Art

JP-A-2018-104197 discloses a printer which is an example of a medium-transport apparatus for transporting a medium. This printer includes an apparatus main body having a transport path through which a medium, such as paper, is transported. The rear surface of the apparatus main body is provided with one or two covers that can be attached to and removed from the apparatus main body. An intermediate roller is attached to the cover. When the cover is removed from the apparatus main body, the intermediate roller is pulled out of the apparatus main body and a part of the transport path is exposed. Therefore, when a medium jam occurs, the jammed medium can be removed by removing the cover.

The apparatus main body also has an extension unit having a medium container added to its lower side. The extension unit includes one or three stages. A protective wall (an example of the cover) on the back of the extension unit rotates around the lower end as a fulcrum by pulling a jam removal lever. That is, the protective wall as an example of the cover has a vertically open structure that can be opened and closed around the lower end. The protective wall as an example of the cover supports a driven roller paired with a feed roller that feeds a medium from the medium container. The jammed medium can be removed by opening the protective wall as an example of the cover. When the extension unit includes three stages, three protective walls as an example of three covers are lined up in a vertical direction, each having a vertically open structure that can be opened and closed around the lower end.

In the medium-transport apparatus described in JP-A-2018-104197, since the cover is detachably provided on the apparatus main body, it is necessary to remove and attach the cover every time the medium is jammed, and such jam removal operation is burdensome. Although the apparatus disclosed in JP-A-2018-104197 includes a multistage cover (protective wall) having the vertically open structure that can be opened and closed around the lower end, the configuration in which the covers are stacked in multiple stages, each having the fulcrum of rotation at the lower end, has a problem of poor workability for the jam removal operation in a portion where the fulcrum is located between the covers.

SUMMARY

A medium-transport apparatus is a medium-transport apparatus in which a Z-axis orthogonal to an installation surface of the medium-transport apparatus has a +Z side set on a side of the medium-transport apparatus and a −Z side set on the opposite side with respect to the installation surface, and two axes orthogonal to each other in in-plane directions of the installation surface are an X-axis and a Y-axis. The apparatus includes: an apparatus main body having a transport path that transports a medium; and a cover provided on a side surface of the apparatus main body and configured to be switched between a first state for exposing the transport path and a second state for covering the transport path. The cover is divided into a first cover that has a rotation shaft along the Z-axis and is configured to rotate with respect to the apparatus main body, and a second cover that is arranged on the −Z side of the first cover, has a rotation shaft along the Y-axis on the −Z side, and is configured to rotate with respect to the apparatus main body.

A medium-transport system includes: a medium-transport apparatus; and a feeding device that feeds a medium to the medium-transport apparatus. Here, the medium-transport apparatus in which a Z-axis orthogonal to an installation surface of the medium-transport apparatus has a +Z side set on a side of the medium-transport apparatus and a −Z side set on the opposite side with respect to the installation surface, and two axes orthogonal to each other in in-plane directions of the installation surface are an X-axis and a Y-axis, includes an apparatus main body having a transport path that transports a medium and a cover provided on a side surface of the apparatus main body and configured to be switched between a first state for exposing the transport path and a second state for covering the transport path. The cover is divided into a first cover that has a rotation shaft along the Z-axis and is configured to rotate with respect to the apparatus main body, and a second cover that is arranged on the −Z side of the first cover, has a rotation shaft along the Y-axis on the −Z side, and is configured to rotate with respect to the apparatus main body. The feeding device is arranged in an X-axis direction with respect to the apparatus main body of the medium-transport apparatus, accommodates the medium, and is configured to feed the medium that is accommodated to the transport path. The medium-transport apparatus is configured such that the medium is fed from the feeding device. A lower end of the first cover on the −Z side is closer to the +Z side than an upper end of the feeding device on the +Z side.

DESCRIPTION OF EXEMPLARY EMBODIMENTS

Figure 1:
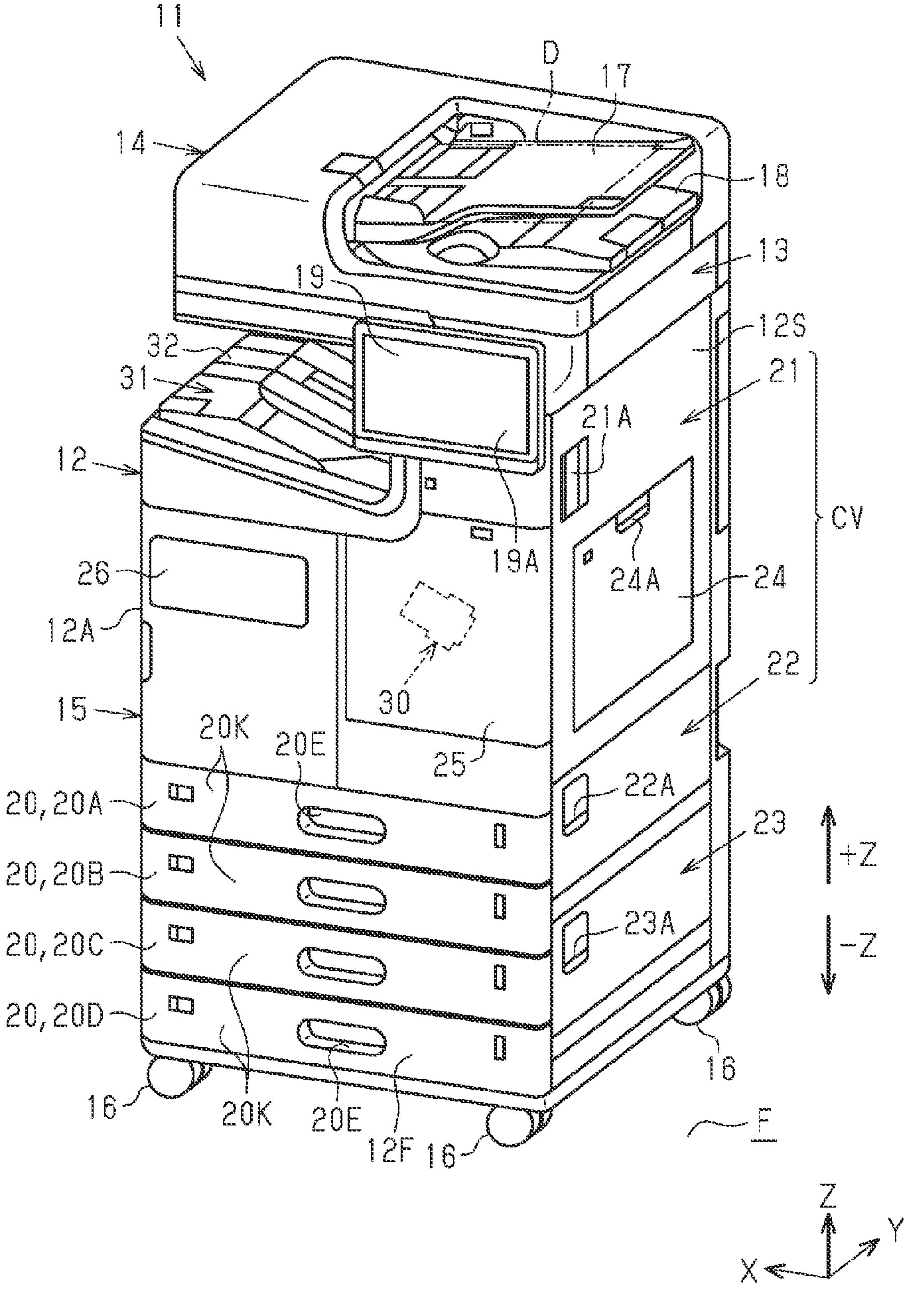
FIG. 1 is a perspective view showing a multifunction machine according to an embodiment.

Hereinafter, one embodiment will be described with reference to the drawings. As an example of a medium-transport apparatus, a multifunction machine has multiple functions including, for example, an image reading function (scan function) to output an image obtained by scanning a document as image data, a copy function to print the image obtained by scanning the document on a medium, and a printing function to print characters and images on the medium. The multifunction machine may be provided with a facsimile function.

In the drawings, a multifunction machine 11 is placed on a horizontal installation surface F. As for a Z-axis orthogonal to the installation surface F of the multifunction machine 11, the multifunction machine 11 side is the +Z side and the opposite side is the −Z side with respect to the installation surface F. Also, two axes orthogonal to each other in the in-plane directions of the installation surface F are X-axis and Y-axis. Furthermore, the directions parallel to the X-axis, Y-axis, and Z-axis are referred to as X-axis direction, Y-axis direction, and Z-axis direction, respectively. The X-axis direction includes both +X direction and −X direction. The Y-axis direction includes both +Y direction and −Y direction. The Z-axis direction includes both +Z direction and −Z direction. The Z-axis direction, which is parallel to the Z-axis, is also referred to as a vertical direction Z. The X-axis direction is a width direction when the multifunction machine 11 is viewed from the front. The front side of the multifunction machine 11 is the side where an operation panel 19 to be operated by a user to give an instruction to the multifunction machine 11 is located. Therefore, the direction parallel to the X-axis is also referred to as the width direction X. Furthermore, the Y-axis is parallel to the direction in which a cassette (medium container) to be described later is attached and removed. The Y-axis is parallel to a depth direction of the multifunction machine 11. Therefore, the Y-axis direction is also referred to as the depth direction Y.

About Configuration of Multifunction Machine

As shown in FIG. 1, the multifunction machine 11 includes a rectangular parallelepiped apparatus main body 12, an image reader 13 arranged on the apparatus main body 12, and an automatic document feeder 14 arranged on the image reader 13. The apparatus main body 12 also serves as a main part of a printer unit 15. The multifunction machine 11 has a configuration in which the printer unit 15, the image reader 13, and the automatic document feeder 14 are stacked in this order from the lower side in the vertical direction Z. The apparatus main body 12 has a transport path T (see FIG. 2) for transporting a medium M such as paper. The multifunction machine 11 is installed on the installation surface F in a state where a plurality of casters 16 provided at the bottom of the apparatus main body 12 are in contact with the ground.

The image reader 13 is configured to be able to read images such as characters and pictures recorded on a document D. The automatic document feeder 14 has a document tray 17 on which the document D (two-dot chain line in FIG. 1) can be mounted. The automatic document feeder 14 feeds the document D mounted on the document tray 17 toward the image reader 13. The document D read by the image reader 13 is discharged onto a discharge tray 18. The automatic document feeder 14 also serves as a document platen cover for the image reader 13, and is provided so as to be openable and closable with respect to the image reader 13. When the automatic document feeder 14 is opened, a document platen (not shown) arranged on the upper side of the image reader 13 is exposed. After the document is mounted on the document platen, the automatic document feeder 14 is closed. The image reader 13 can read the document mounted on the document platen.

The operation panel 19 to be operated when giving an instruction to the multifunction machine 11 is provided in the upper part of the apparatus main body 12. The operation panel 19 has a display unit 19A. The display unit 19A has a touch panel screen, for example. The touch panel is a display panel that enables instructions to be given to the multifunction machine 11 by touching the screen. The operation panel 19 may have buttons for operation, or may consist of only the buttons for operation.

The multifunction machine 11 includes a cassette 20 (medium container) on which a plurality of media M are mounted. A plurality of media M are housed in the cassette 20. The cassette 20 is, for example, a paper feed cassette capable of housing paper as an example of the medium M. The multifunction machine 11 of this embodiment has a total of four cassettes 20. The four cassettes 20 are stacked in four stages in the vertical direction Z in the lower part of the apparatus main body 12. The plurality of cassettes 20 are detachably installed in the apparatus main body 12. The cassettes 20 are configured to be retractable in the Y-axis direction with respect to the apparatus main body 12. The plurality of cassettes 20 contain media M of different sizes or paper types, for example.

As shown in FIG. 1, each cassette 20 has a cassette cover 20K facing the Y-axis direction. The cassette cover 20K is an example of a fourth cover that can be opened and closed with respect to the apparatus main body 12, and is provided on a side surface 12F of the apparatus main body 12 facing the Y-axis direction. The direction in which the side surface 12F faces, on which the cassette cover 20K is provided, is the same as the direction in which the operation panel 19 of the multifunction machine 11 faces. The cassette cover 20K is provided on the cassette 20 that can be pulled out in the Y-axis direction. The cassette cover 20K is also provided with a handle 20E for the user to pull out the cassette 20.

Any number of stages can be set for the cassettes 20. The number of stages of the cassettes 20 is not limited to four, and may be two, three, five, or six.

Alternatively, some of the stages of the cassettes 20 may be configured using an extension unit that is optionally added. For example, the multifunction machine 11 may have a configuration in which two stages of cassettes 20 are included as standard and an extension unit including two stages of cassettes 20 is optionally added by the user. The extension unit may also be configured such that additional cassettes 20 may be provided one by one.

Figure 2:
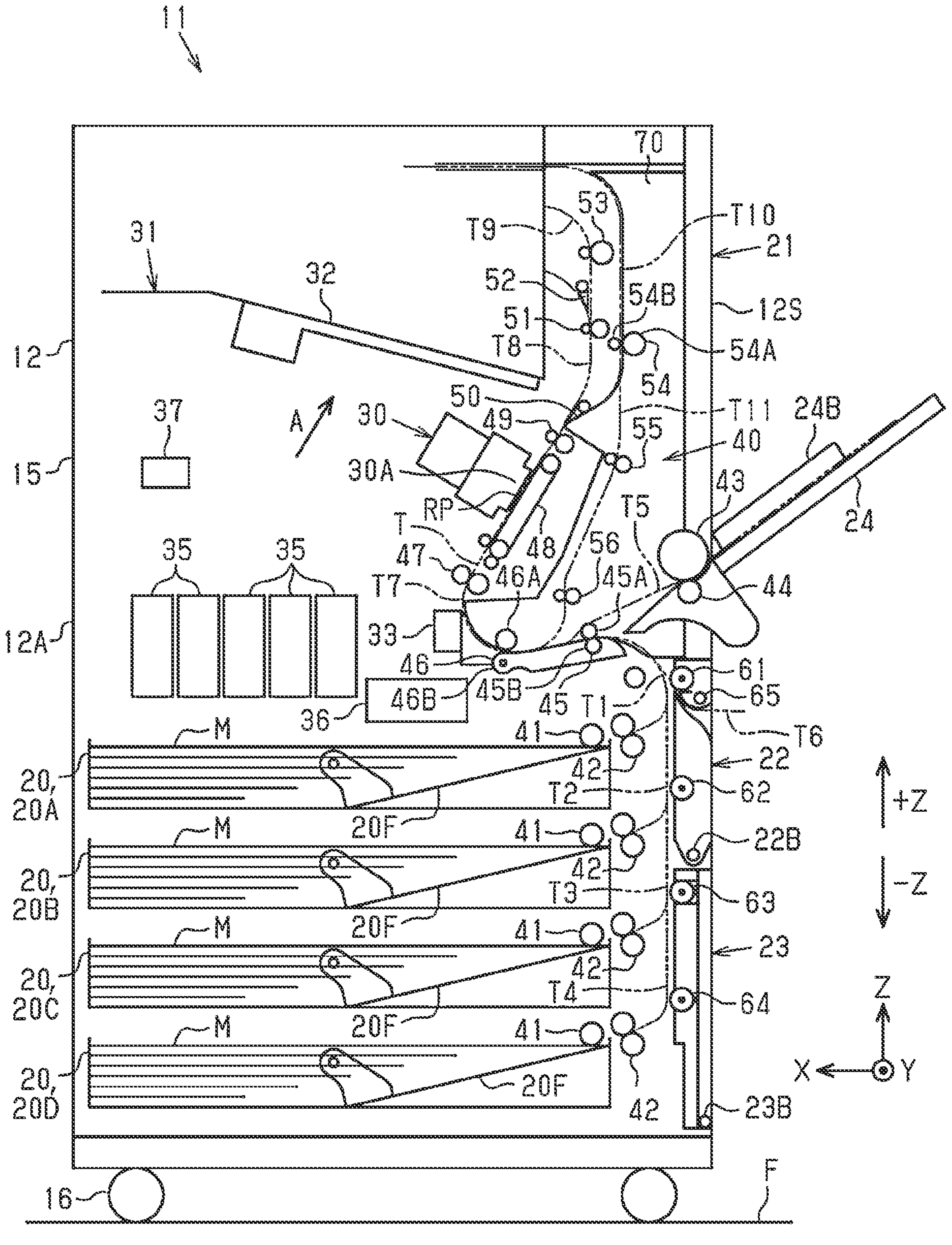
FIG. 2 is a schematic front view showing a printer unit of the multifunction machine.

As shown in FIGS. 1 and 2, a cover CV is provided on a side surface 12S of the apparatus main body 12, the cover CV being capable of switching between a first state where the transport path T (see FIG. 2) is exposed and a second state where the transport path T is covered. The cover CV is divided into a first cover 21 and a second cover 22.

That is, on the side surface 12S, the first cover 21 and the second cover 22 located below the first cover 21 are provided so as to be openable and closable with respect to the apparatus main body 12. A third cover 23 is further provided on the side surface 12S at a position below the second cover 22 so as to be openable and closable with respect to the apparatus main body 12.

The first cover 21 is larger than the second cover 22. That is, the first cover 21 has a larger area (occupied area) that occupies the side surface 12S than the second cover 22. The first cover 21 has a handle 21A for the user to open and close the cover. The first cover 21 also includes a feed tray 24 as an example of a tray for mounting the medium M. The feed tray 24 is attached so as to be openable and closable to the first cover 21. The feed tray 24 has a handle 24A.

The second and third covers 22 and 23 have substantially the same size and shape. The second cover 22 has a handle 22A for the user to open and close the cover. Likewise, the third cover 23 has a handle 23A for the user to open and close the cover. The second and third covers 22 and 23 have the handles 22A and 23A at substantially the same position (upper left position in FIG. 1) on the cover surface. In this embodiment, most of the side surface 12S can be opened and closed by the first to third covers 21 to 23.

Furthermore, as shown in FIG. 1, an openable front cover 25 is provided in the upper right part of the cassette 20 on the front of the apparatus main body 12. The front cover 25 can be opened and closed sideways with the right end as its rotation shaft. The second and third covers 22 and 23 may be different from each other in at least one of the size and the shape. In FIG. 1, the third cover 23 may be eliminated, and the second cover 22 may include single cover having a size obtained by combining the second and third covers 22 and 23 shown in FIG. 1.

As shown in FIG. 1, the apparatus main body 12 also includes a recording unit 30 that performs recording on the medium M (see FIG. 2). The recording unit 30 performs recording on the medium M fed from the cassette 20 and on the medium M fed from the feed tray 24. A liquid supply source 35 (see FIG. 2) containing ink as an example of a liquid is housed in the apparatus main body 12. The recording unit 30 performs recording on the medium M using a liquid such as ink supplied from the liquid supply source 35. As shown in FIG. 1, a window portion 26 is provided in a region corresponding to the liquid supply source 35 on the front of the apparatus main body 12. The user can visually recognize the remaining amount in the liquid supply source 35 through the window portion 26.

A concave discharge unit 31 is provided between the apparatus main body 12 and the image reader 13. The discharge unit 31 includes a discharge tray 32 that constitutes a bottom portion thereof. The discharge tray 32 is a plate-shaped member, and the discharged medium M is loaded on the upper surface of the discharge tray 32. The discharge tray 32 is tilted at a predetermined angle such that the downstream in a discharge direction in which the recorded medium M is discharged is higher than the upstream. The apparatus main body 12 has a discharge port (not shown) that opens in one sidewall (right sidewall) that forms the recess of the discharge unit 31. The recorded medium M is discharged through the discharge port and loaded on the discharge tray 32 of the discharge unit 31. The discharge tray 32 is obliquely formed so that the downstream in the discharge direction of the medium M is higher than the upstream. The medium M discharged onto the discharge tray 32 descends along the slope under its own weight and hits against a regulation wall (not shown), and thus the upstream ends in the discharge direction are aligned.

Configuration of Printer Unit

Next, a configuration of the printer unit 15 will be described with reference to FIG. 2.

Inside the apparatus main body 12, a transport unit 40 is provided, which transports the medium M along the transport path T. Inside the apparatus main body 12, a medium width sensor 33 that detects the medium M transported along the transport path T, the recording unit 30 that performs recording on the medium M, the liquid supply source 35 that supplies a liquid such as ink to the recording unit 30, a waste liquid storage unit 36 that stores a waste liquid such as ink, and a control unit 37 that controls the operation of the respective units of the multifunction machine 11 are also provided. The recording unit 30 includes a liquid ejecting head 30A that ejects a liquid such as ink onto the medium M. The liquid ejecting head 30A ejects a liquid such as ink supplied from the liquid supply source 35 through an unillustrated tube from a nozzle (not shown). The liquid supply source 35 may be a liquid cartridge such as an ink cartridge or may be a liquid tank such as an ink tank.

In the example shown in FIG. 2, the liquid ejecting head 30A is arranged in a posture tilted with respect to the horizontal direction. More specifically, in the liquid ejecting head 30A, a nozzle surface in which a nozzle that ejects the liquid opens is arranged in a posture tilted with respect to the horizontal direction. The liquid ejecting head 30A faces a transport belt 48. The liquid ejecting head 30A ejects the liquid onto the medium M transported along the transport direction A on the transport belt 48. The angle at which the liquid ejecting head 30A is tilted with respect to the horizontal direction can be changed accordingly. For example, the liquid ejecting head 30A and the transport belt 48 may be arranged horizontally (tilt angle 0°). The recording unit 30 may be configured to include a recording head other than the liquid ejecting head 30A that ejects the liquid. Other recording heads may include a dot impact recording head, a thermal recording head, and a laser recording head, for example, that performs recording with a toner.

The transport unit 40 includes a plurality of rollers and the like provided along the transport path T. More specifically, the transport unit 40 includes a feed roller 41 and a pair of separation rollers 42 for the cassette 20, a feed roller 43 and a separation roller 44 for the feed tray 24, transport roller pairs 45 to 47 and 54 to 56 in a transport system, discharge roller pairs 49, 51, and 53, transport rollers 61 to 64, and a carry-in roller 65. The transport path T includes: first to sixth transport paths T1 to T6, which are the transport paths of a feeding system; and seventh to ninth transport paths T7 to T9 and reverse paths T10 and T11, which are the transport paths of the transport system.

To be more specific, the feed roller 41 and the pair of separation rollers 42 are provided for each cassette 20 at a position near the downstream end in the feeding direction of the plurality of cassettes 20 inserted into the apparatus main body 12. A plurality of media M housed in the cassette 20 have their downstream portions in the feeding direction mounted on a mounting plate 20F biased toward the +Z side (upper side). The mounting plate 20F is rotatably provided with respect to the cassette 20 inserted into the apparatus main body 12, and biases the medium M toward the +Z side in a state where the medium is lifted upward more on its downstream in the feeding direction. The uppermost medium M among the plurality of media M mounted on the mounting plate 20F is pressed against the feed roller 41. By rotating the feed roller 41 in this state, the uppermost medium M is sent in the feeding direction. Only one piece of the sent media M is sent downstream after separated by the separation action of the separation roller pair 42 that rotates while nipping the medium. The media M fed from each cassette 20 are transported to the +Z side along the respective transport paths T1 to T4, and reach the transport path T7. The media M fed from the cassette 20 are transported toward the downstream transport path T7 by the transport rollers 61 to 64 provided along the respective transport paths T1 to T4.

As shown in FIG. 2, the feed tray 24 includes an edge guide 24B for positioning the mounted medium M in the width direction. The first cover 21 includes the feed roller 43 that feeds the medium M mounted on the feed tray 24 to the transport path T. The first cover 21 also includes the separation roller 44 that rotates in contact with the feed roller 43. The transport path T5 to which the medium M is transported from the feed tray 24 by the feed roller 43 and the separation roller 44 merges with the transport path T7.

There is also the transport path T6 for carrying in the medium M through a carry-in port 66 on the second cover 22. The transport path T6 is a transport path used to carry the medium M into the multifunction machine 11 from an external device. The second cover 22 is provided with the carry-in roller 65 for carrying in the medium M through the carry-in port 66 along the transport path T6. The transport roller 61 also serves as a transport roller to transport the medium M along the transport path T6. The medium M carried in from the transport path T6 merges with the downstream transport path T7.

As shown in FIG. 2, the transport path T7 bends in a region facing the medium width sensor 33, and extends diagonally upward from the medium width sensor 33. The medium M is transported to a recording position RP facing the liquid ejecting head 30A along the transport path T7 by the rotation of the transport roller pairs 45, 46, and 47. At the recording position RP, the medium M is transported on the transport belt 48 arranged at a position facing the liquid ejecting head 30A. The liquid ejecting head 30A performs recording on the medium M transported on the transport belt 48. The liquid ejecting head 30A is, for example, of an ink jet recording type that ejects a liquid such as ink. At the recording position, the medium M is transported in a direction A. The recorded medium M is transported downstream by the discharge roller pair 49. A flap 50 is provided at a downstream position of the discharge roller pair 49. The flap 50 distributes the media M into the transport path T8 and the reverse path T10.

At the time of single-sided recording for recording on only one side of the medium M, the medium M having its first side recorded is distributed to the transport path T8 by the flap 50. The medium M distributed to the transport path T8 is transported downstream by the discharge roller pair 51. On the other hand, at the time of double-sided recording for recording on both sides of the medium M, the medium M having its first side recorded is distributed from the transport path T7 to the reverse path T10 by the flap 50 after finishing the recording on one side.

Further, a flap 52 is provided in the middle of the transport path T8. The flap 50 distributes the medium M into the transport path T8 and the transport path T9. The medium M transported along the transport path T8 is discharged onto the discharge tray 32 of the discharge unit 31. Further, the medium M distributed to the transport path T9 is discharged to the discharge unit 31 by the discharge roller pair 53 provided along the transport path T9, and is discharged to a discharge tray (not shown) provided in the discharge unit 31.

The medium M subjected to the single-sided recording and sent to the reverse path T10 is switched back on the reverse path T10 and then transported backward on the reverse path T10 toward the −Z side. Then, the medium is transported from the reverse path T10 to the −Z side through the reverse path T11. After being transported along the reverse path T11 by the transport roller pair 55 and 56 provided along the reverse path T11, the medium merges with the transport path T7. That is, the medium M that has passed through the reverse paths T10 and T11 by switchback is re-fed to the transport path T7 in a state where the front and back thereof are reversed. In this event, the re-fed medium M is transported along the transport path T7 in a state where the second side, which is opposite to the recorded first side, faces the liquid ejecting head 30A. The liquid ejecting head 30A records on the second side of the re-fed medium M. The medium M for which the double-sided recording has been completed by recording on the second side is discharged from the transport path T8 or the transport path T9 to the discharge unit 31. In this embodiment, the transport path T has the reverse paths T10 and T11 as an example of switchback paths.

The first cover 21 is arranged at a position corresponding to the reverse paths T10 and T11. In this embodiment, the first cover 21 forms the reverse paths T10 and T11, which are the example of switchback paths. The transport roller pair 45 provided along the transport path T7 includes a pair of a drive roller 45A and a driven roller 45B. Likewise, the transport roller pair 46 includes a pair of a drive roller 46A and a driven roller 46B. The transport roller pair 54 provided along the reverse path T10 includes a pair of a drive roller 54A and a driven roller 54B. On the back of the first cover 21, a transport mechanism 70 forming the reverse paths T10 and T11 is assembled. That is, when the first cover 21 is opened, the transport mechanism 70 is separated from the apparatus main body 12.

Also, the first cover 21 is heavier than the second cover 22. This is because the first cover 21 has a larger area than the second cover 22, and is provided with the transport mechanism 70 that forms the reverse paths T10 and T11 over the entire back surface thereof. The amount of protrusion of the transport mechanism 70 to the +X side in the first cover 21 is larger than the amount of protrusion of a third guide unit 73 (see FIG. 4) provided on the back of the second cover 22 to the +X side. Therefore, the weight of the first cover 21 and the transport mechanism 70 is considerably heavy. Furthermore, the first cover 21 includes the feed tray 24 and also includes the feed roller 43 and the like for feeding the medium M from the feed tray 24. The weights of such components also contribute to making the first cover 21 heavier than the second cover 22.

As shown in FIG. 2, the position of the second cover 22 in the Z-axis direction overlaps the position of the cassette 20 in the Z-axis direction. Meanwhile, the position of the first cover 21 in the Z-axis direction does not overlap the position of the cassette 20 in the Z-axis direction, and the first cover 21 covers the transport path downstream of the transport path covered by the second cover 22. The transport paths covered by the second cover 22 are, as shown in FIG. 2, the first transport path T1 and the second transport path T2. The transport paths covered by the first cover 21 are, as shown in FIG. 2, the seventh transport path T7 and the reverse paths T10 and T11.

The control unit 37 includes a central processing unit (CPU), a read only memory (ROM), a random access memory (UM), and a storage, which are not shown. The control unit 37 controls the transport of the medium M in the printer unit 15 and the recording operation on the medium M by the liquid ejecting head 30A. More specifically, the control unit 37 is not limited to the one that performs software processing for all the processing executed by itself. For example, the control unit 37 may include a dedicated hardware circuit (for example, an application specific integrated circuit: ASIC) that performs hardware processing for at least a part of the processing executed by the control unit 37. That is, the control unit 37 may be configured as circuitry including one or more processors that operate according to a computer program (software), one or more dedicated hardware circuits that execute at least some of various kinds of processing, or a combination thereof. The processor includes a CPU and a memory such as a RAM and a ROM, and the memory stores program codes or commands configured to cause the CPU to execute processing. The memory, that is, a computer-readable medium includes any available medium accessible by a general-purpose or dedicated computer.

The printer unit 15 is provided with a plurality of sensors (detectors) (not shown) that can detect the presence of the medium M on the transport path T. The control unit 37 determines whether or not the medium M on the transport path T is in an appropriate position when the recording operation for recording on the medium M is being performed. When it is detected that the medium M is in an inappropriate position on the transport path T, it is determined that a jam of the medium M has occurred. The control unit 37 identifies the jam occurrence location based on detection signals from the plurality of sensors, and displays a message to the effect that the jam has occurred on the display unit 19A. The message contains information about the cover to be opened to perform a jam removal operation. The user opens the cover notified by the message and performs the jam removal operation.

Cover Configuration

Figure 3:
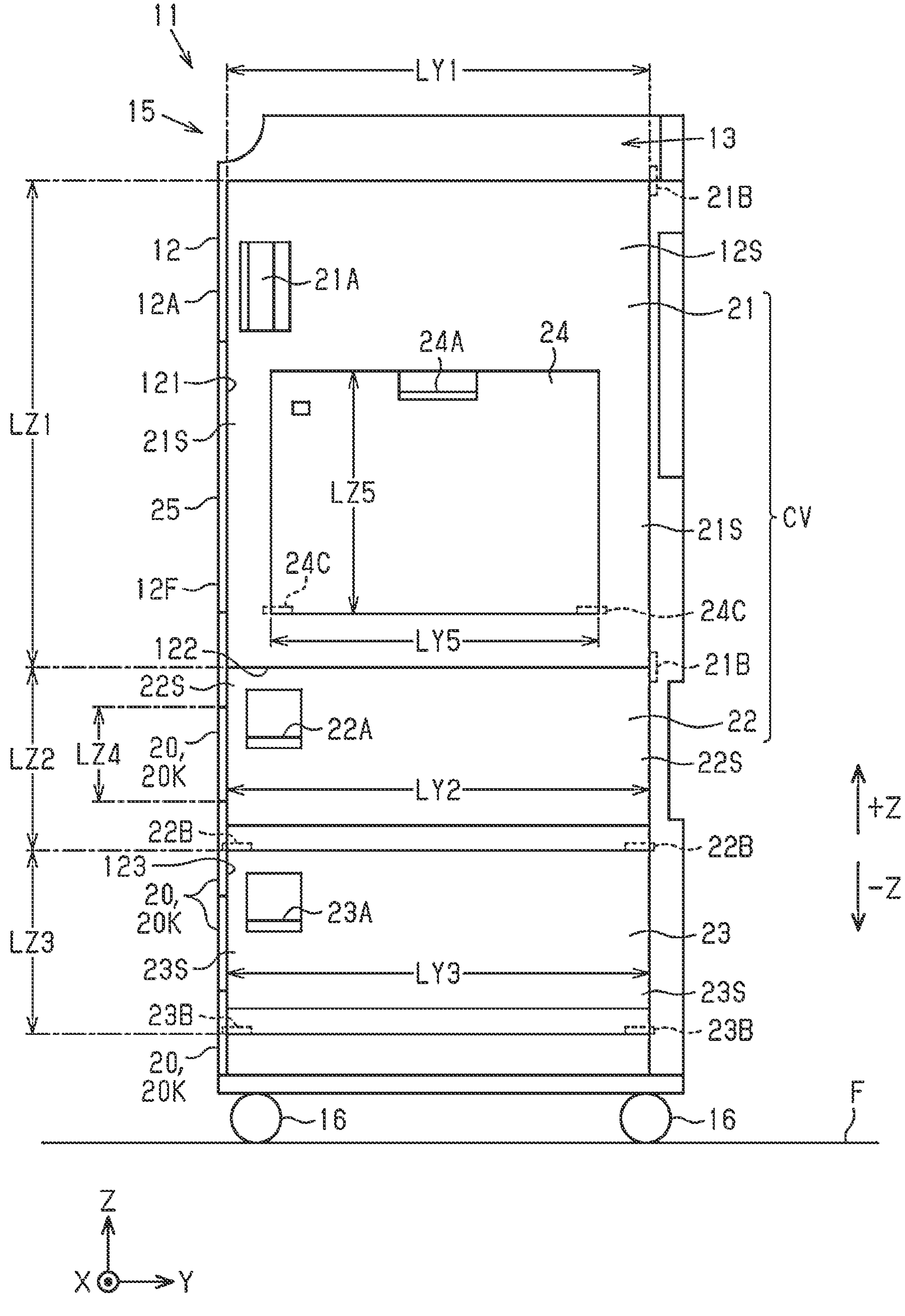
FIG. 3 is a partial side view showing the multifunction machine.

FIG. 3 shows the side surface 12S of the printer unit 15 where the cover CV is provided. The apparatus main body 12 is provided with a first opening 121 in a region facing the first cover 21. The first cover 21 closes the first opening 121 in its closed state and opens the first opening 121 in its open state. The apparatus main body 12 is provided with a second opening 122 in a region facing the second cover 22. The second cover 22 closes the second opening 122 in its closed state and opens the second opening 122 in its open state. The apparatus main body 12 is provided with a third opening 123 in a region facing the third cover 23. The third cover 23 closes the third opening 123 in its closed state and opens the third opening 123 in its open state.

As shown in FIG. 3, the first cover 21 has a rotation shaft 21B along the Z-axis and is rotatably provided with respect to the apparatus main body 12. The second cover 22 is arranged on the −Z side of the first cover 21, has a rotation shaft 22B along the Y-axis on the −Z side, and is rotatably provided with respect to the apparatus main body 12. Since the cover CV is divided into the first cover 21 and the second cover 22, the transport path T extending over the first and second covers 21 and 22 is configured to be continuously opened by opening the first and second covers 21 and 22. Note that the continuous opening means that, in the closed state, for example, a frame such as a crosspiece or a non-door portion such as an exterior is not arranged between the first and second covers 21 and 22. In other words, the continuous opening means that, in the open state, a frame such as a crosspiece or a non-door portion made of an exterior that separates the first opening 121 corresponding to the first cover 21 and the second opening 122 corresponding to the second cover 22 is not arranged. Therefore, when both of the first and second covers 21 and 22 are opened, one large continuous opening is formed by the first and second openings 121 and 122.

When the third cover 23 is eliminated and the second cover 22 has a size capable of covering the first to fourth transport paths T1 to T4, the second cover 22 may occupy a smaller area of the side surface 12S than the first cover 21. However, the first and second covers 21 and 22 may occupy the same area of the side surface 12S. Alternatively, the second cover 22 may occupy a larger area of the side surface 12S than the first cover 21.

As shown in FIG. 3, a dimension LY1 in the Y-axis direction of the first cover 21 may be larger than a dimension LZ2 in the Z-axis direction of the second cover 22 (LY1>LZ2).

The dimension LY1 in the Y-axis direction of the first cover 21 may be smaller than a dimension LZ1 in the Z-axis direction of the first cover 21 (LY1<LZ1).

A dimension LY2 in the Y-axis direction of the second cover 22 may be larger than the dimension LZ2 in the Z-axis direction of the second cover 22 (LY2>LZ2).

The dimension LZ2 in the Z-axis direction of the second cover 22 may be smaller than the dimension LZ1 in the Z-axis direction of the first cover 21 (LZ2<LZ1).

The dimension LY1 in the Y-axis direction of the first cover 21 may be equal to the dimension LY2 in the Y-axis direction of the second cover 22 (LY1=LY2). Furthermore, a side edge 21S extending in the Z-axis direction of the first cover 21 and a side edge 22S extending in the Z-axis direction of the second cover 22 may be on a straight line in the Z-axis direction.

The third cover 23 is arranged on the −Z side of the cover CV, and has a rotation shaft 23B along the Y-axis orthogonal to the Z-axis on the −Z side. The third cover 23 may be configured to be rotatable about the rotation shaft 23B with respect to the apparatus main body 12. A dimension LY3 in the Y-axis direction of the third cover 23 may be larger than a dimension LZ3 in the Z-axis direction of the third cover 23 (LY3>LZ3). The dimension LY3 in the Y-axis direction of the third cover 23 may be equal to the dimension LY2 in the Y-axis direction of the second cover 22 (LY2=LY3). Moreover, a side edge 23S extending in the Z-axis direction of the third cover 23 and the side edge 22S extending in the Z-axis direction of the second cover 22 may be on a straight line in the Z-axis direction. Furthermore, the three side edges 21S, 22S, and 23S may be on a straight line in the Z-axis direction.

As shown in FIG. 3, the dimensions LZ2 and LZ3 in the Z-axis direction of the second and third covers 22 and 23 are smaller than half (½) of the dimension LZ1 in the Z-axis direction of the first cover 21 (LZ2<LZ1/2, LZ3<LZ1/2).

As shown in FIG. 3, a dimension LZ4 in the Z-axis direction of the cassette 20 may be smaller than the dimensions LZ2 and LZ3 in the Z-axis direction of the second and third covers 22 and 23 (LZ4<LZ2, LZ4<LZ3).

The feed tray 24 has a rotation shaft 24C along the Y-axis and is configured to be rotatable with respect to the first cover 21. As shown in FIG. 3, a dimension LY5 in the Y-axis direction of the feed tray 24 may be smaller than the dimensions LY2 and LY3 in the Y-axis direction of the second and third covers 22 and 23 (LY5<LY2, LY5<LY3). Also, a dimension LZ5 in the Z-axis direction of the feed tray 24 may be larger than the dimensions LZ2 and LZ3 in the Z-axis direction of the second and third covers 22 and 23 (LZ5>LZ2, LZ5>LZ3).

Figure 4:
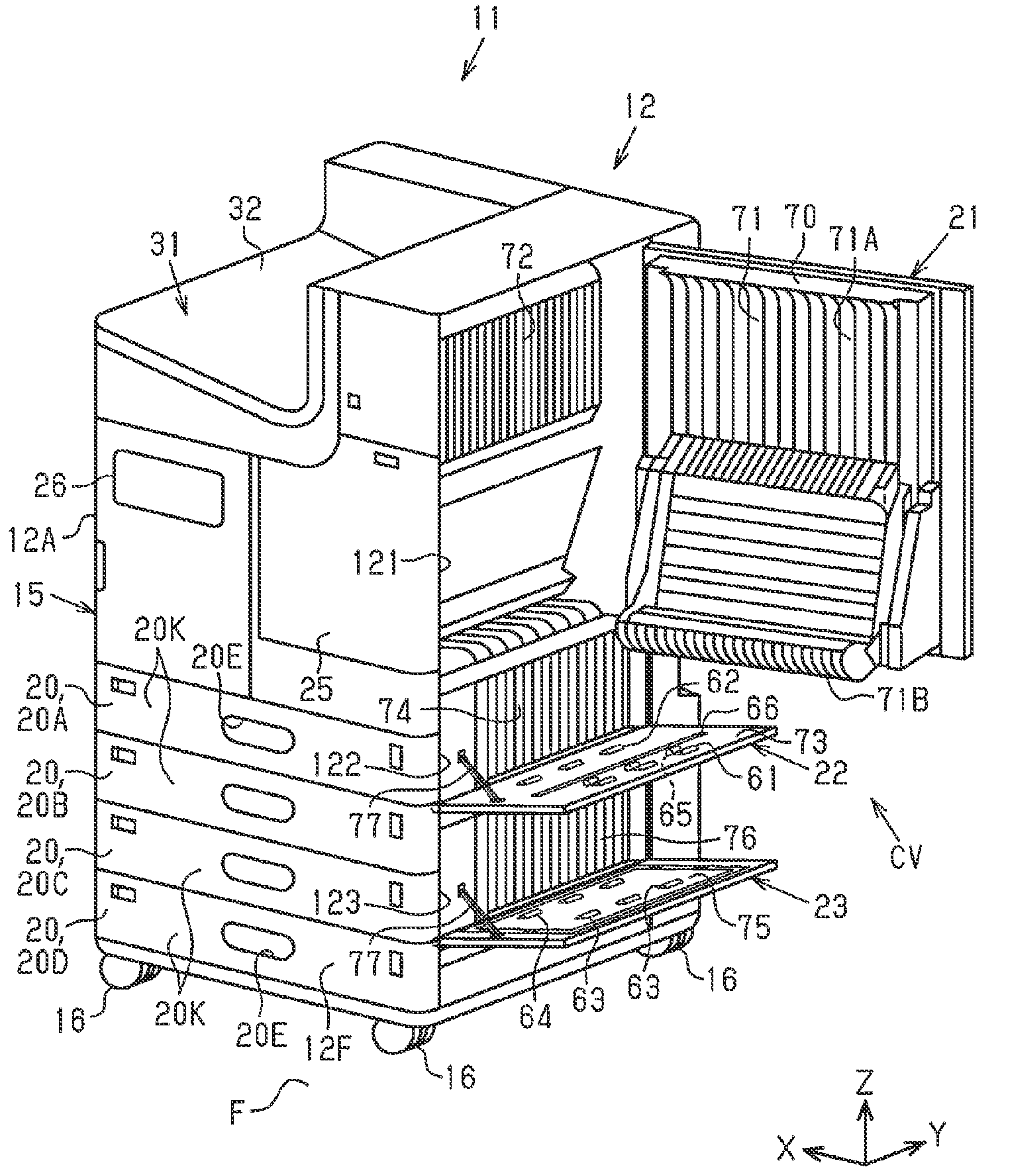
FIG. 4 is a perspective view showing the printer unit in a state where a first cover and a second cover are open.

FIG. 4 shows a state in which the first cover 21, the second cover 22, and the third cover 23 are open. In FIG. 4, some rollers are omitted. As shown in FIG. 4, the transport mechanism 70 is assembled on the back of the first cover 21. More specifically, as shown in FIG. 4, the transport mechanism 70 is assembled on the back of the first cover 21. The transport mechanism 70 includes a first guide member 71 that guides the medium M and the above-described plurality of driven rollers 46B and 54B and a plurality of transport roller pairs 55 and 56, which are omitted in FIG. 4 and assembled to the first guide member 71. The first guide member 71 has a guide surface 71A forming a part of the reverse path T10 and a guide surface 71B forming a part of the transport path T7. A second guide member 72 facing the first cover 21 is also assembled to the apparatus main body 12. When the first cover 21 is closed, the reverse paths T10 and T11 are formed between the first guide member 71 and the second guide member 72. The driven rollers 45B, 46B, and 54B (see FIG. 2) paired with the drive rollers 45A, 46A, 54A on the first cover 21 side are also assembled to the second guide member 72 on the apparatus main body 12 side.

When the first cover 21 is closed, the transport path T7 and the reverse paths T10 and T11 (see FIG. 2) are formed between the first guide member 71 and the second guide member 72. Furthermore, the drive rollers 45A, 46A, and 54A and the driven rollers 45B, 46B, and 54B are arranged at positions where the medium M can be nipped, for example, to form the transport roller pairs 45, 46, and 54. As shown in FIG. 4, when the first cover 21 is opened, the first and second guide members 71 and 72 are separated, and the drive rollers 45A, 46A, and 54A and the driven rollers 45B, 46B, and 54B (see FIG. 2 for both) which constitute the transport roller pairs 45, 46, and 54 are separated. Therefore, as shown in FIG. 4, when the first cover 21 is opened, the inside of the apparatus main body 12 is exposed through the first opening 121. That is, the second guide member 72 on the apparatus main body 12 side is exposed through the first opening 121. Therefore, when the medium M is jammed in the reverse paths T10 and T11, a jam removal operation can be performed on the exposed first and second guide members 71 and 72 by opening the first cover 21.

As shown in FIG. 4, the second and third covers 22 and 23 are coupled to the apparatus main body 12 so as to be openable and closable by means of support links 77. The maximum opening degree of the second and third covers 22 and 23 is regulated by the support links 77. In this example, the second and third covers 22 and 23 have the same maximum opening degree. The second and third covers 22 and 23 have the maximum opening degree within a range of 0 to 30° from the horizontal (for example, about 10°). The second and third covers 22 and 23 can assume an inclined posture in which the both covers are inclined with an opening degree up to the maximum opening degree.

The second cover 22 includes on its back a first transport roller 61 that transports the medium M fed from the first cassette 20A and a second transport roller 62 that transports the medium M fed from the second cassette 20B. The first transport roller 61 transports the medium M along the first transport path T1 (see FIG. 2), when the second transport roller 62 transports the medium M along the second transport path T2 (see FIG. 2). The back of the second cover 22 serves as the third guide unit 73, and the first and second transport rollers 61 and 62 are partially exposed from the third guide unit 73. A plurality of the transport rollers 61 and 62 are arranged in a row in the depth direction Y (medium width direction) to form a roller train. The second cover 22 includes a carry-in port 66 through which the medium M passes, which is transported from a large-capacity paper feed unit 80 (see FIG. 5) to be described later. The second cover 22 includes a carry-in roller 65 that carries in the medium M fed through the carry-in port 66. As shown in FIG. 4, when the second cover 22 is opened, the third guide unit 73 on its back and a fourth guide unit 74 on the apparatus main body 12 side are exposed through the second opening 122 of the apparatus main body 12. Therefore, when the medium M is jammed in the transport paths T1 and T2, a jam removal operation can be performed on the exposed third and fourth guide units 73 and 74 by opening the second cover 22.

The third cover 23 includes on its back a third transport roller 63 that transports the medium M fed from a third cassette 20C and a fourth transport roller 64 that transports the medium M fed from a fourth cassette 20D. The third transport roller 63 transports the medium M along the third transport path T3 (see FIG. 2), when the fourth transport roller 64 transports the medium M along the fourth transport path T4 (see FIG. 2). The back of the third cover 23 serves as a fifth guide unit 75, and the third and fourth transport rollers 63 and 64 are partially exposed from the fifth guide unit 75. A plurality of the transport rollers 63 and 64 are arranged in a row in the depth direction Y (medium width direction) to form a roller train. When the third cover 23 is opened, the fifth guide unit 75 on its back and a sixth guide unit 76 on the apparatus main body 12 side are exposed through the third opening 123 of the apparatus main body 12. Therefore, when the medium M is jammed in the transport paths T3 and T4, a jam removal operation can be performed on the exposed fifth and sixth guide units 75 and 76 by opening the third cover 23.

When the first and second covers 21 and 22 are both opened, the first and second openings 121 and 122 are continuously opened. That is, there is no frame or exterior such as a crosspiece between the first and second openings 121 and 122. Therefore, in the event of a jam across the transport paths T1 and T2 and the reverse paths T10 and T11, the first and second openings 121 and 122 are continuously opened when the first and second covers 21 and 22 are both opened. Thus, the jam removal operation is facilitated.

Configuration of Recording System

Figure 5:
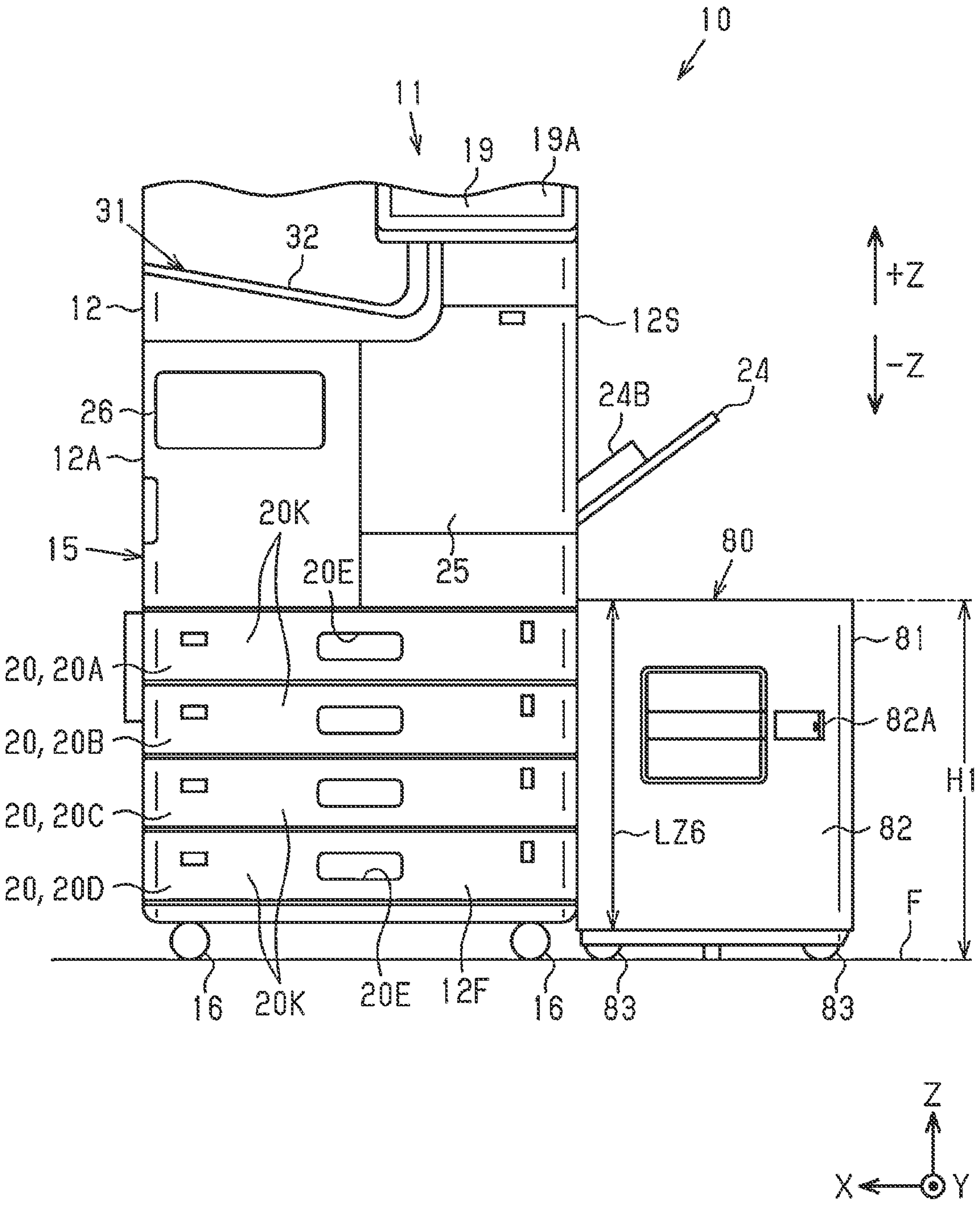
FIG. 5 is a front view showing a recording system including the multifunction machine and a large-capacity paper feed unit.

FIG. 5 shows a recording system 10. As shown in FIG. 5, the recording system 10 as an example of a medium-transport system includes the multifunction machine 11 and the large-capacity paper feed unit 80 that supplies the medium M to the multifunction machine 11. The large-capacity paper feed unit 80 is used in combination with the multifunction machine 11. In this example, the large-capacity paper feed unit 80 is coupled to the multifunction machine 11 at the portion of the second cover 22. The large-capacity paper feed unit 80 is arranged side by side with the apparatus main body 12 in the X-axis direction. The large-capacity paper feed unit 80 accommodates a plurality of media M. The maximum number of sheets that can be accommodated in the large-capacity paper feed unit 80 is larger than the maximum number of sheets that can be accommodated in one of the cassettes 20. The large-capacity paper feed unit 80 feeds the accommodated medium M to the transport path T in the multifunction machine 11. The apparatus main body 12 of the multifunction machine 11 is configured so as to enable the medium M to be fed from the large-capacity paper feed unit 80 to the transport path T.

As shown in FIG. 5, the large-capacity paper feed unit 80 includes a housing 81, a large-capacity cassette 82 that can be attached to and removed from the housing 81, and casters 83 that come into contact with the installation surface F. The large-capacity cassette 82 has a handle 82A on its surface (front) facing the Y-axis direction, which is operated by the user when pulling out the cassette. As shown in FIG. 5, a dimension LZ6 in the Z-axis direction of the large-capacity cassette 82 is larger than the dimension LZ4 (see FIG. 3) in the Z-axis direction of the cassette 20 on the multifunction machine 11 side. Therefore, the number of sheets loaded in the large-capacity cassettes 82 is larger than the number of sheets loaded in the cassette 20. The large-capacity cassette 82 of this embodiment has a height dimension of approximately four stages of the cassettes 20.

As shown in FIG. 5, a height dimension Hi of the large-capacity paper feed unit 80 from the installation surface F is slightly higher than the height of the upper end of the first cassette 20A in the uppermost stage in the multifunction machine 11 including four stages of the cassettes 20. The height dimension Hi of the large-capacity paper feed unit 80 is set to a dimension that does not interfere with the feed tray 24 when the feed tray 24 of the multifunction machine 11 is opened.

Figure 6:
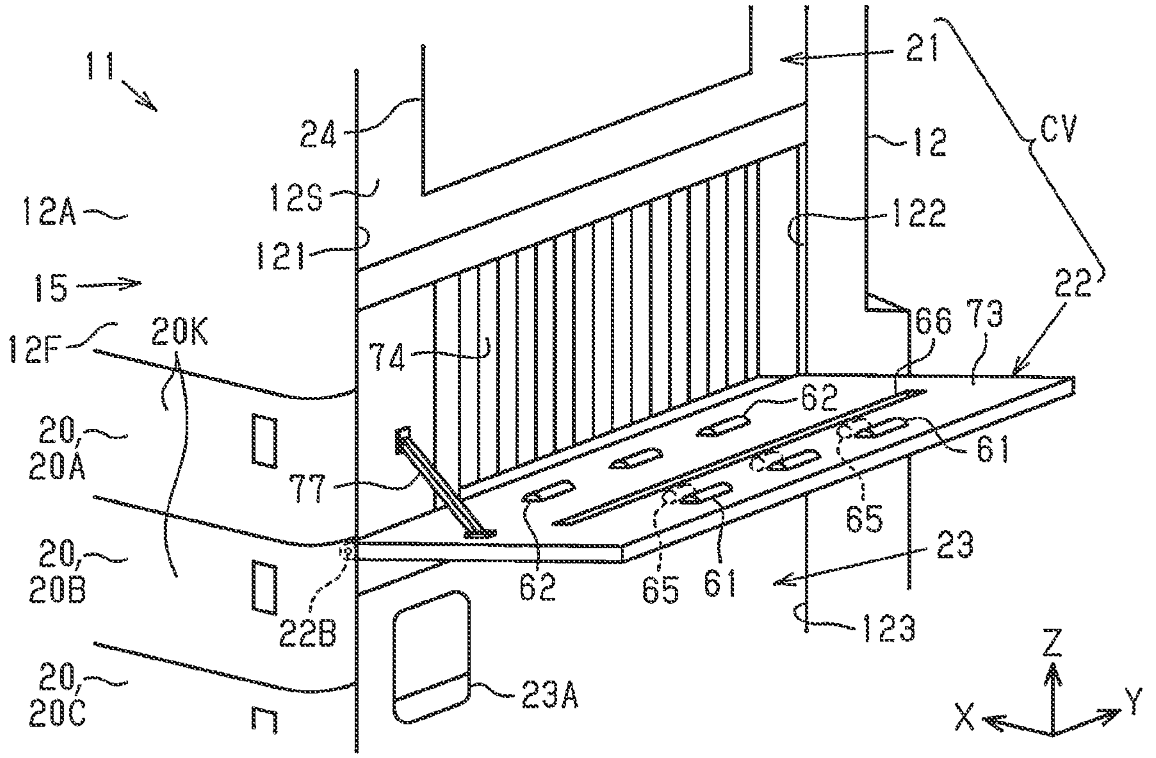
FIG. 6 is a perspective view showing a part of the multifunction machine with the second cover open.
Figure 7:
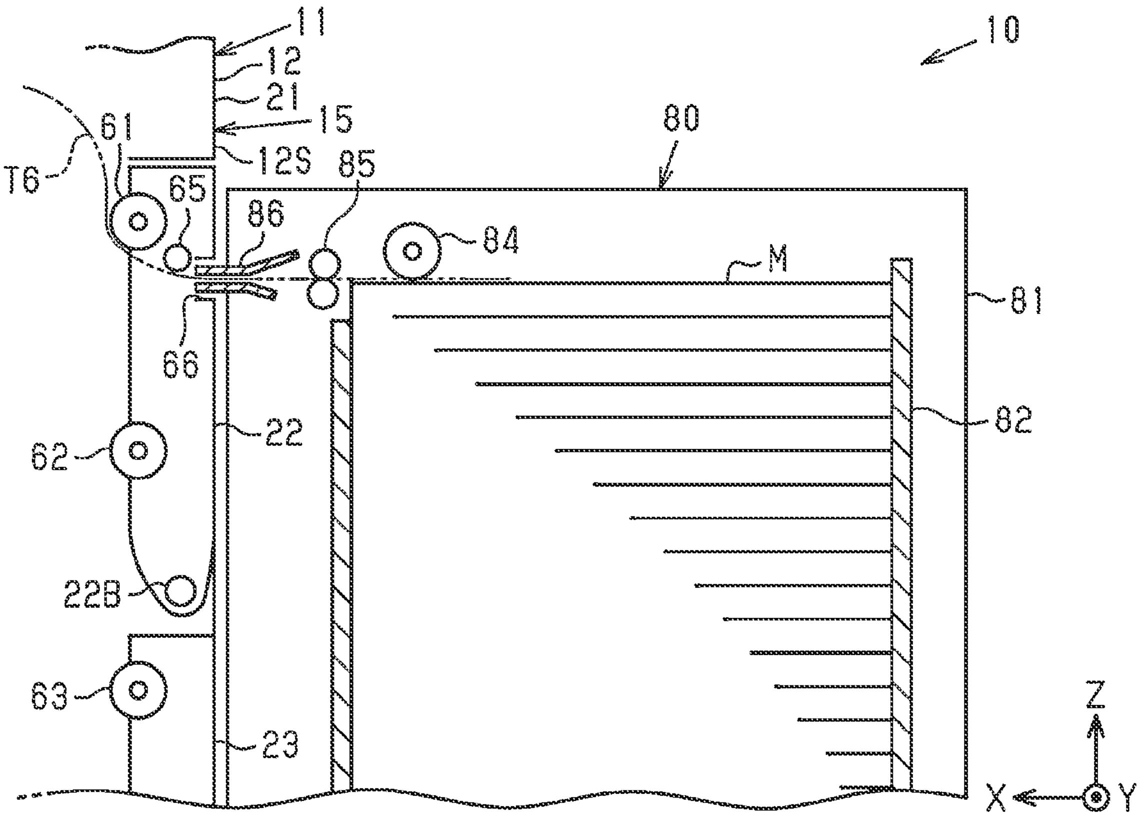
FIG. 7 is a schematic front sectional view showing a state where the second cover is coupled to the large-capacity paper feed unit.

As shown in FIGS. 6 and 7, the second cover 22 includes the carry-in port 66 through which the medium M passes, which is transported from the large-capacity paper feed unit 80. The carry-in port 66 opens between the first and second transport rollers 61 and 62. The second cover 22 may include the carry-in roller 65 for carrying in the medium M through the carry-in port 66. The carry-in roller 65 transports the medium M in the middle of the path from the carry-in port 66 to the first transport roller 61. That is, in this example, the first transport roller 61 also has a transport function to transport the medium M carried in from the large-capacity paper feed unit 80 through the carry-in port 66. The medium M carried into the multifunction machine 11 from the large-capacity paper feed unit 80 through the carry-in port 66 is transported along the transport path T6 inside the apparatus main body 12 and merges with the transport path T7. The medium M may be guided from the carry-in port 66 to the first transport roller 61 by a rib provided in the middle of the path without providing the carry-in roller 65.

As described above, the large-capacity paper feed unit 80 shown in FIG. 7 feeds the medium to the apparatus main body 12 of the multifunction machine 11 through the carry-in port 66 opened in the second cover 22. Thus, in the Z-axis direction, the position of the large-capacity paper feed unit 80 in the Z-axis direction overlaps the position of the second cover in the Z-axis direction.

As shown in FIG. 7, a feed roller 84 and a separation roller pair 85 are provided at an upper position in the housing 81 of the large-capacity paper feed unit 80. A feed guide 86 extends horizontally from a position corresponding to the separation roller pair 85 on one side surface of the housing 81. The large-capacity paper feed unit 80 is coupled to the multifunction machine 11 in a state where the tip end portion of the feed guide 86 is inserted into the carry-in port 66 opened in the second cover 22 of the multifunction machine 11.

The large-capacity cassette 82 in the housing 81 of the large-capacity paper feed unit 80 houses a plurality of media M in a stacked state. The plurality of media M housed in the large-capacity cassette 82 are biased toward the +Z side in the vertical direction Z by an unillustrated spring. Therefore, the plurality of media M are pressed against the feed roller 84. When the feed roller 84 rotates, the uppermost one of the plurality of media M is fed. In this event, only one medium M is separated by the separation roller pair 85. Therefore, feeding of more than one medium M at a time is suppressed. Accordingly, the media M are fed one by one from the feed guide 86 of the large-capacity paper feed unit 80 to the multifunction machine 11.

Figure 8:
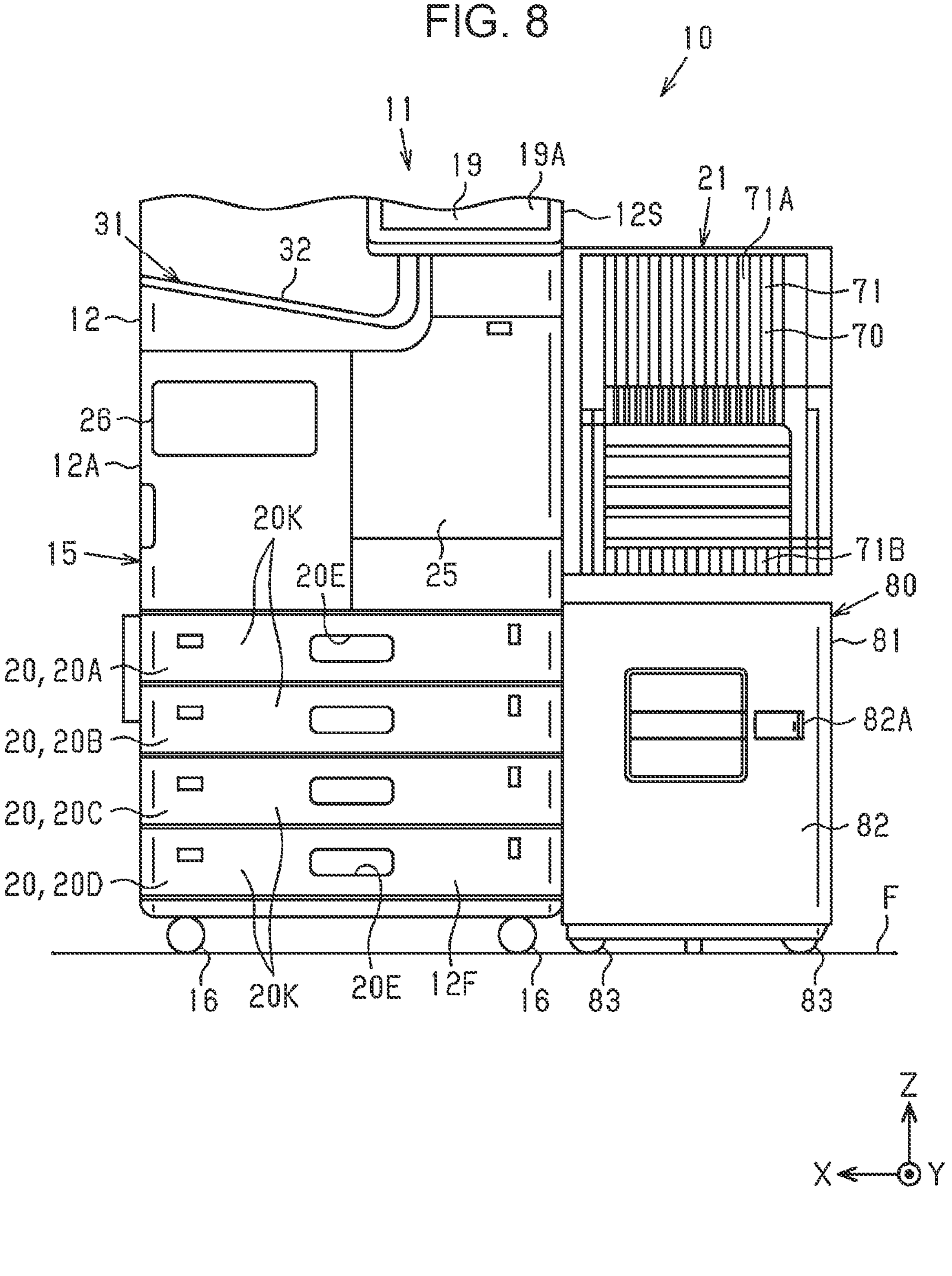
FIG. 8 is a front view showing the recording system with the first cover open.

As shown in FIG. 7, the lower end on the −Z side of the first cover 21 of the multifunction machine 11 is located closer to the +Z side than the upper end on the +Z side of the large-capacity paper feed unit 80. That is, the upper end surface of the large-capacity paper feed unit 80 is located at a position lower than the lower end of the first cover 21. Therefore, as shown in FIG. 8, even when the first cover 21 is opened, the first cover 21 does not collide with the large-capacity paper feed unit 80. Thus, when performing a jam removal operation by opening only the first cover 21, the large-capacity paper feed unit 80 does not have to be moved.

The first cover 21 can be opened and closed around the rotation shaft 21B (see FIG. 3) along the Z-axis on the rear end side, and the first cover 21 moves to the rear side when opened. Therefore, the user can even perform the jam removal operation from the front side of the multifunction machine 11 without the first cover 21 getting in the way.

As shown in FIG. 7, in the Z-axis direction, the position of the large-capacity paper feed unit 80 in the Z-axis direction overlaps the position of the second cover 22 in the Z-axis direction. Therefore, when opening the second cover 22, the large-capacity paper feed unit 80 has to be moved from the apparatus main body 12 in the X-axis direction. The distance for moving the large-capacity paper feed unit 80 in the X-axis direction depends on the dimension LZ2 in the Z-axis direction of the second cover 22. In order to reduce this distance, the dimension LY1 in the Y-axis direction of the first cover 21 may be larger than the dimension LZ2 in the Z-axis direction of the second cover 22. That is, the height dimension LZ2 of the second cover 22 may be smaller than the width dimension LY1 of the first cover 21.

Figure 9:
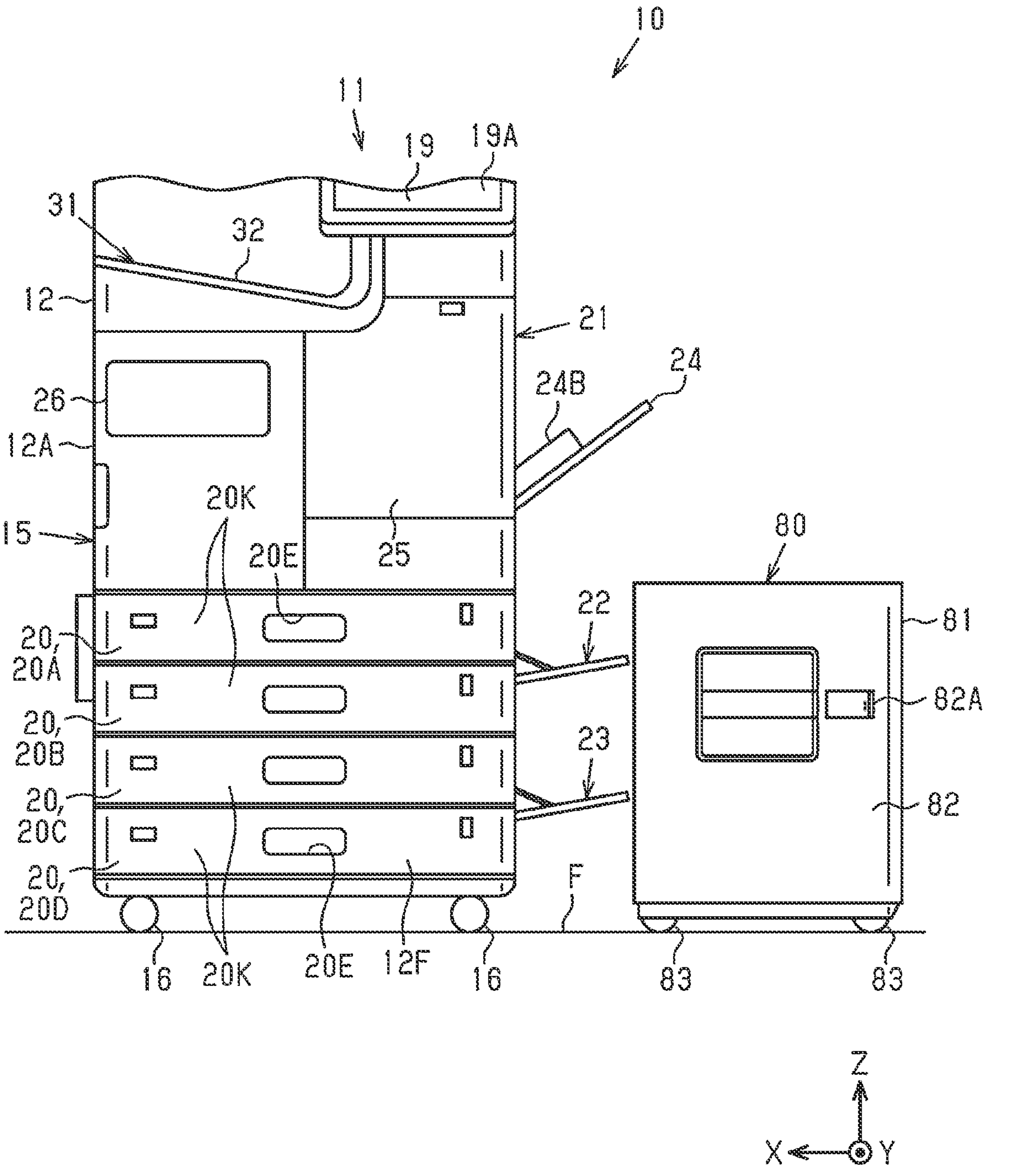
FIG. 9 is a front view showing the recording system with the second cover open.

As shown in FIG. 9, when opening at least one of the second and third covers 22 and 23, the large-capacity paper feed unit 80 is moved in the X-axis direction by a predetermined distance and separated from the multifunction machine 11. The predetermined distance is a distance required to open at least one of the second and third covers 22 and 23. The dimensions LZ2 and LZ3 in the Z-axis direction of the second and third covers 22 and 23 may be smaller than the dimensions LY2 and LY3 in the Y-axis direction, respectively. Also, the dimensions LZ2 and LZ3 may be smaller than half (½) of the dimension LZ1 in the Z-axis direction of the first cover 21 (LZ2<LZ1/2, LZ3<LZ1/2). In such cases, when opening the second cover 22 or the third cover 23, the distance for moving the large-capacity paper feed unit 80 in the X-axis direction can be shortened.

Figure 10:
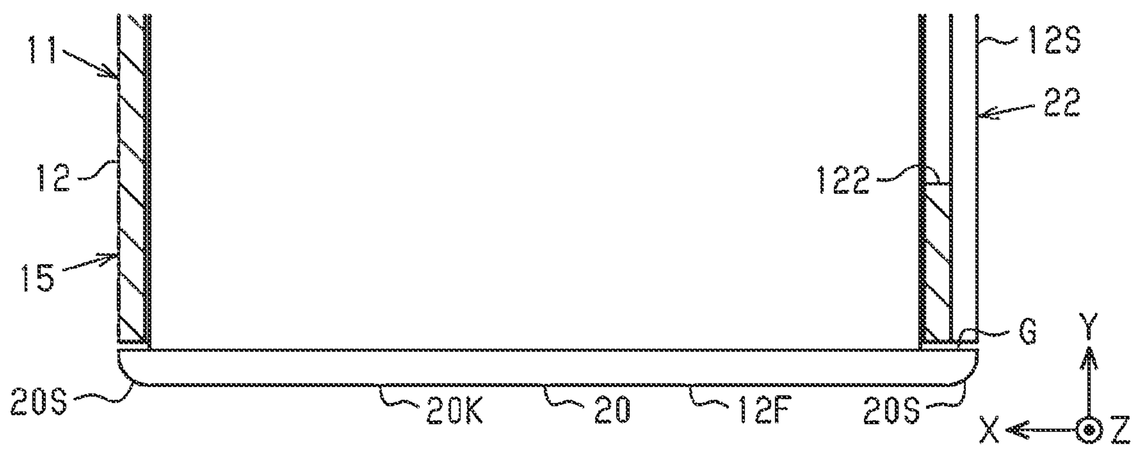
FIG. 10 is a schematic plan sectional view showing a part of a medium container inserted into an apparatus main body.

As shown in FIG. 10, a side edge 20S of the cassette cover 20K as an example of the fourth cover may form a gap G with at least one of the side edge 21S of the first cover 21 and the side edge 22S of the second cover 22. The gap G may open in the X-axis direction. That is, when the multifunction machine 11 is viewed from the front, the gap G may be hidden behind the side edge 20S of the cassette 20 so that the gap G cannot be seen.

Operation

Operations of the multifunction machine 11 and the recording system 10 of this embodiment will be described.

The plurality of cassettes 20 house media M of different sizes and/or different paper types. The user instructs the multifunction machine 11 to record by specifying recording conditions including the size and paper type of the medium M. The medium M is fed from the cassette 20 that accommodates the medium M of the specified size and paper type. The medium M fed from the cassette 20 reaches the transport path T7 through at least some of the transport paths T1 to T4. Then, the liquid ejecting head 30A records on the medium M at the recording position RP on the transport path T7. The recorded medium M is discharged from the transport path T8 or the transport path T9 to the discharge unit 31.

In the case of double-sided recording, the medium M recorded on its first side by the liquid ejecting head 30A is sent to the reverse path T10 by the flap 50, and is transported upward along the reverse path T10. Then, the medium is transported backward along the reverse path T10 by switchback in which the transport direction is reversed. The backward-transported medium M is re-fed along the reverse paths T10 and T11 by the transport roller pairs 54 to 56 to the recording position RP facing the liquid ejecting head 30A. In this event, the medium M is re-fed in a direction in which the second side opposite to the first side of the medium M faces the liquid ejecting head 30A. The liquid ejecting head 30A records on the second side of the re-fed medium M. Then, the medium M subjected to the double-sided recording is discharged from the transport path T8 or the transport path T9 to the discharge unit 31.

In the case of mass recording using the multifunction machine 11, the large-capacity paper feed unit 80 is used as the supply source of the medium M. That is, recording on the medium M is performed using the recording system 10 including the multifunction machine 11 and the large-capacity paper feed unit 80. By inserting the feed guide 86 of the large-capacity paper feed unit 80 into the carry-in port 66 of the second cover 22 of the multifunction machine 11, the large-capacity paper feed unit 80 is coupled to the multifunction machine 11.

Once the recording is started, the media M housed in the large-capacity paper feed unit 80 are fed one by one into the apparatus main body 12 of the multifunction machine 11 through the feed guide 86 and the carry-in port 66. In this event, the medium M is fed to the recording position RP through the transport paths T6 and T7 by the rotation of the carry-in roller 65 and the first transport roller 61. Then, the liquid ejecting head 30A records on the medium M at the recording position RP. The recorded medium M is discharged to the discharge unit 31. In the case of double-sided recording, as in the case described above, the medium M is re-fed to the recording position RP after being reversed by switchback transport via the reverse paths T10 and T11. Thus, the medium M is recorded on its both sides. The medium M subjected to the double-sided recording is discharged to the discharge unit 31. Accordingly, the recorded media M are loaded on the discharge tray 32, for example.

Jam Removal Operation for Multifunction Machine 11

During the recording operation of the multifunction machine 11, the medium M may be jammed in the middle of the transport path T. The control unit 37 monitors the presence of jam occurrence based on detection signals from a plurality of sensors provided in various places on the transport path T. Upon detection of a jam, the control unit 37 displays a message to the effect that the jam has occurred on the display unit 19A. Based on information on the cover to be opened in order to remove the jam included in the message, the user opens the specified cover to perform the jam removal operation.

When the cover specified in the message is the first cover 21, the user opens the first cover 21 to perform the jam removal operation.

When the first and second covers 21 and 22 are those specified in the message, the user opens the first and second covers 21 and 22 to perform the jam removal operation as shown in FIG. 4. Since the first cover 21 is openable sideways and the second cover 22 is vertically openable and rotatable about the lower end, the first and second openings 121 and 122 are continuously opened. Therefore, since there is nothing obstructing between the first and second openings 121 and 122, the jam removal operation can be efficiently performed.

The first cover 21 is larger than the second cover 22, has the transport mechanism 70 integrally provided on its back, and includes the feed tray 24. Therefore, the first cover 21 is considerably heavy. For this reason, when the first cover 21 is opened, the first cover 21 is likely to hang down under its own weight. However, below the first cover 21 in its open state, the vertically openable second cover 22 is retracted downward. Therefore, even when the first cover 21 hangs down under its own weight, the first cover 21 does not collide with the second cover 22.

Figure 11:
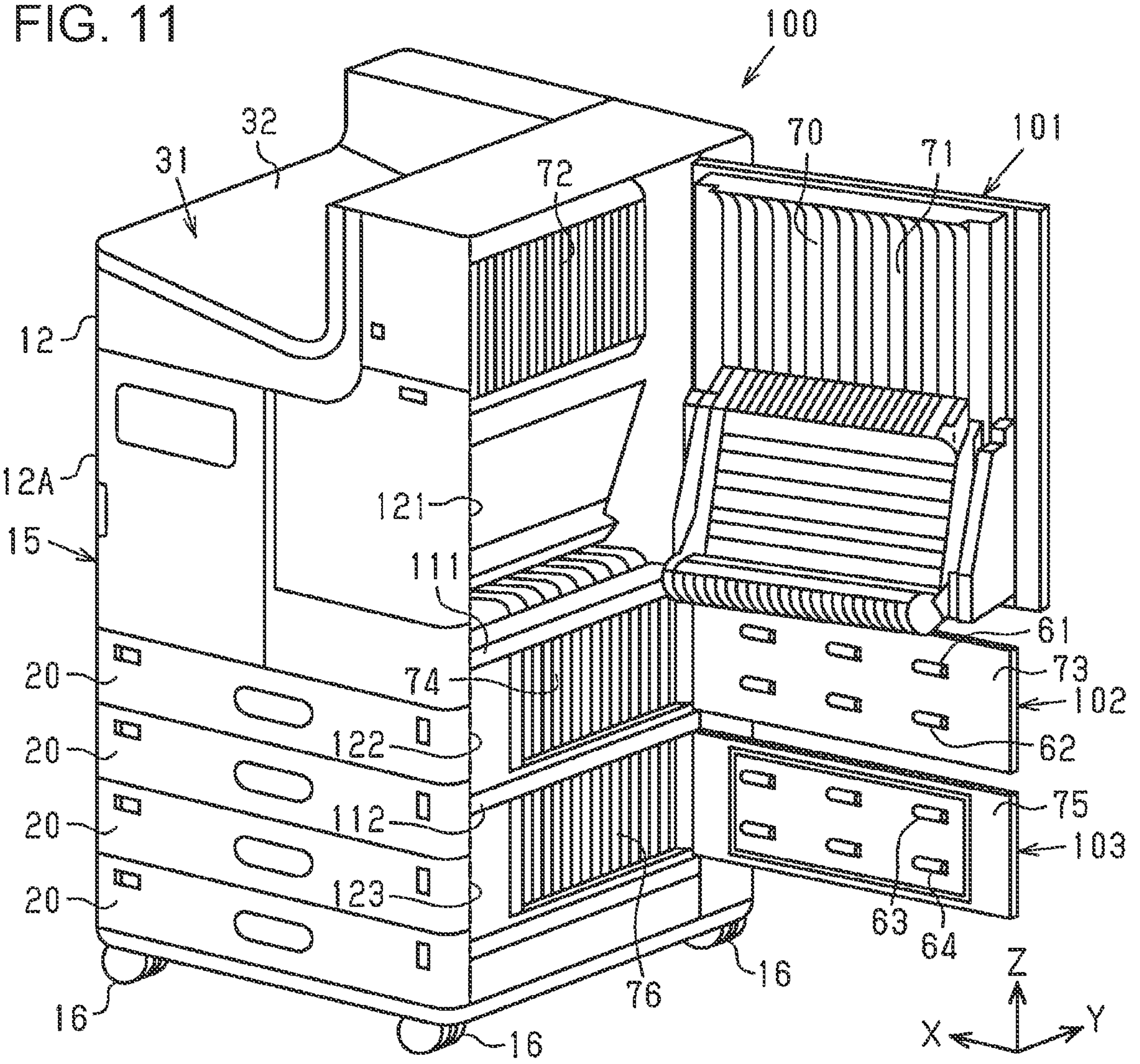
FIG. 11 is a perspective view showing a printer unit of a comparative example in a state where a first cover and a second cover are open.

In a multifunction machine 100 of a comparative example shown in FIG. 11, for example, a first cover 101 is openable sideways as in the embodiment, but a second cover 102 and a third cover 103 are also openable sideways. In the configuration of this comparative example, a crosspiece 111 made of a frame or an exterior needs to be provided between the first and second covers 101 and 102. Therefore, when the first and second covers 101 and 102 are opened, there is the crosspiece 111 obstructing between a first operation 121 and a second opening 122. For this reason, the crosspiece 111 may interfere with a jam removal operation. Even when the crosspiece 111 is eliminated, when the first cover 101 hangs down under its own weight, the first cover is likely to come into contact with the second cover 102 which is at the same height as the closed state when the first cover 101 is opened sideways. For example, the first and second covers 101 and 102 may collide with each other. In this case, the first and second covers 101 and 102 needs to be carefully opened and closed. In the comparative example, a crosspiece 112 is also provided between the second cover 102 that is openable sideways and the third cover 103 that is also openable sideways.

On the other hand, according to the multifunction machine 11 of this embodiment, the first cover 21 is openable sideways and the second cover 22 is vertically openable with its lower end as a fulcrum. Therefore, even when the first cover 21 hangs down under its own weight when opening both the first and second covers 21 and 22, the first and second covers 21 and 22 are unlikely to come into contact with or collide with each other. Moreover, since the first and second openings 121 and 122 form a continuous opening when the first and second covers 21 and 22 are opened, a jam removal operation can be performed in a state where there is no obstruction such as a crosspiece.

Jam Removal Operation in Recording System

When a jam occurs in the recording system 10 including the large-capacity paper feed unit 80, the user performs a jam removal operation as follows.

When the first cover 21 is specified in a message, the first cover 21 is opened while the large-capacity paper feed unit 80 remains coupled to the multifunction machine 11 as shown in FIG. 8. In this event, although the large-capacity paper feed unit 80 is located on the side surface 12S side of the multifunction machine 11, the user can perform a jam removal operation on the first opening 121 from the front side of the multifunction machine 11.

When at least one of the second and third covers 22 and 23 is specified in the message, the large-capacity paper feed unit 80 is moved in the X-axis direction and separated from the multifunction machine 11 by a predetermined distance as shown in FIG. 9. Then, at least one of the second and third covers 22 and 23 is opened. For example, as in the example shown in FIG. 9, the second and third covers 22 and 23 are both opened. The dimensions LZ2 and LZ3 in the Z-axis direction of the second and third covers 22 and 23 are smaller than the dimensions LY2 and LY3 thereof in the Y-axis direction. In this example, the dimensions LZ2 and LZ3 in the Z-axis direction of the second and third covers 22 and 23 are shorter than half of the dimension LZ1 in the Z-axis direction of the first cover 21. Therefore, the predetermined distance for which the large-capacity paper feed unit 80 needs to be moved in the X-axis direction in order to open at least one of the second and third covers 22 and 23 can be shortened. Accordingly, the installation area including the jam removal operation required for installing the recording system 10 can be relatively reduced.

Advantageous effects of this embodiment will be described.

1. As for the Z-axis orthogonal to the installation surface F of the multifunction machine 11 as an example of a medium-transport apparatus, the medium-transport apparatus side is the +Z side and the opposite side is the −Z side with respect to the installation surface F. Also, two axes orthogonal to each other in the in-plane directions of the installation surface F are the X-axis and Y-axis, respectively. The multifunction machine 11 includes: the apparatus main body 12 having the transport path T for transporting the medium M; and the cover CV provided on the side surface 12S of the apparatus main body 12 and configured to be switched between a first state of exposing the transport path T and a second state of covering the transport path T. The cover CV is divided into: the first cover 21 that has the rotation shaft 21B along the Z-axis and is rotatable with respect to the apparatus main body 12; and the second cover 22 that is arranged on the −Z side of the first cover 21, has the rotation shaft 22B along the Y-axis on the Z-side, and is rotatable with respect to the apparatus main body 12.

According to this configuration, since the cover CV is divided into the first and second covers 21 and 22, the transport path T that extends over the first and second covers 21 and 22 is continuously opened by opening the first and second covers 21 and 22. Therefore, good workability is achieved. Even when the first cover 21 is likely to hang down on the −Z side under its own weight, the hanging first cover 21 is less likely to collide with the second cover 22 since the rotation shaft 22B of the second cover 22 arranged on the −Z side is arranged along the Y-axis on the −Z side. Thus, good opening/closing operation can be ensured. Therefore, good workability when the cover is opened and good opening/closing operation of the cover can be both achieved.

2. The apparatus main body 12 is configured such that the medium M can be fed from the large-capacity paper feed unit 80 as an example of a feeding device which is arranged in the X-axis direction with respect to the apparatus main body 12, accommodates the medium M, and feeds the accommodated medium M to the transport path T. The lower end of the first cover 21 on the −Z side is closer to the +Z side than the upper end of the large-capacity paper feed unit 80 on the +Z side.

According to this configuration, the lower end of the first cover 21 on the −Z side is closer to the +Z side than the upper end of the large-capacity paper feed unit 80 on the +Z side. Thus, the first cover 21 when opened does not collide with the large-capacity paper feed unit 80. Therefore, good workability is achieved even when the medium M is fed from the large-capacity paper feed unit 80 to the transport path T.

3. The position of the large-capacity paper feed unit 80 in the Z-axis direction overlaps the position of the second cover 22 in the Z-axis direction, and the large-capacity paper feed unit 80 is movable in the X-axis direction with respect to the apparatus main body 12. The LY1 of the first cover 21 in the Y-axis direction is larger than the dimension LZ2 in the Z-axis direction of the second cover 22. According to this configuration, the amount of movement of the large-capacity paper feed unit 80 can be reduced when opening the second cover 22. Therefore, the installation area F (installation area of the medium-transport system) required for jam removal can be reduced.

4. The second cover 22 includes the carry-in port 66 through which the medium M transported from the large-capacity paper feed unit 80 passes. According to this configuration, the large-capacity paper feed unit 80 does not get in the way when opening/closing the first cover 21, as compared with the configuration in which the carry-in port 66 is provided in the first cover 21.

5. The multifunction machine 11 further includes the third cover 23 that is arranged on the −Z side of the cover CV, has the rotation shaft 23B along the Y-axis orthogonal to the Z-axis on the −Z side, and is rotatable with respect to the apparatus main body 12. The dimension LY3 in the Y-axis direction of the third cover 23 is larger than the dimension LZ3 in the Z-axis direction of the third cover 23. According to this configuration, the space required for opening the third cover 23 in the X-axis direction can be reduced. Therefore, the distance for which the large-capacity paper feed unit 80 is moved to open the third cover 23 can be shortened.

6. The dimension LY1 in the Y-axis direction of the first cover 21 is smaller than the dimension LZ1 in the Z-axis direction of the first cover 21. According to this configuration, since the rotation shaft 21B of the first cover 21 is along the Z-axis which is the longitudinal direction of the first cover 21, the space in the X-axis direction required to open the first cover 21 is reduced. At the same time, more transport paths T can be exposed when the first cover 21 is opened.

7. The dimension LY2 in the Y-axis direction of the second cover 22 is larger than the dimension LZ2 in the Z-axis direction of the second cover 22. According to this configuration, since the rotation shaft 22B of the second cover 22 is along the Y-axis which is the longitudinal direction of the second cover 22, the space in the X-axis direction required to open the second cover 22 is reduced. At the same time, more transport paths T can be exposed when the second cover 22 is opened.

8. The dimension LZ2 in the Z-axis direction of the second cover 22 is smaller than the dimension LZ1 in the Z-axis direction of the first cover 21. According to this configuration, the space in the X-axis direction when the second cover 22 is opened can be reduced. Also, a tray or the like can be readily arranged on the first cover 21.

9. The first cover 21 has the feed tray 24 as an example of a tray on which the medium M is mounted. According to this configuration, since the first cover 21 has the feed tray 24, various types of media M (for example, media M that differ in thickness and basis weight) can be fed to the transport path T.

Here, since the first cover 21 has the feed tray 24, the first cover 21 is likely to hang down in the −Z direction. Also, since the position of the large-capacity paper feed unit 80 in the Z-axis direction does not overlap the first cover 21, the feed tray 24 does not collide with the large-capacity paper feed unit 80 when the feed tray 24 is opened. That is, the large-capacity paper feed unit 80 does not need to be moved in the X-axis direction in order to open the feed tray 24. The large-capacity paper feed unit 80 may be at the same height as the second cover 22. In this case, again, the feed tray 24 does not collide with the large-capacity paper feed unit 80 when the feed tray 24 is opened.

10. The first cover 21 includes the feed roller 43 that feeds the medium M mounted on the feed tray 24 to the transport path T. According to this configuration, the medium M jammed in the feed roller 43 can be readily removed by opening the first cover 21.

11. The feed tray 24 has the rotation shaft 24C along the Y-axis and is configured to be rotatable with respect to the first cover 21. According to this configuration, the feed tray 24 can be expanded and stored by rotation.

12. The multifunction machine 11 further includes the cassette 20 having a plurality of media M mounted therein. The position of the second cover 22 in the Z-axis direction overlaps the position of the cassette 20 in the Z-axis direction. The first cover 21 is located at a position where the position in the Z-axis direction does not overlap the position in the Z-axis direction of the cassette 20, and covers the reverse paths T10 and T11 which are transport paths downstream of the transport paths T1 and T2 which are the transport paths covered by the second cover 22. According to this configuration, the transport path T near the cassette 20 is a place where jam removal operations are frequently performed due to multiple feeding or the like. Only this place can be opened by the second cover 22. Therefore, good workability is achieved during the jam removal operation.

13. The first cover 21 is heavier than the second cover 22. According to this configuration, when the first and second covers 21 and 22 are both opened, the first cover 21 is likely to hang down under its own weight, but the second cover 22 is located below the first cover 21 at a distance due to how the both covers 21 and 22 are opened. Therefore, the first cover 21 is less likely to come into contact with the second cover 22.

14. The transport path T has the reverse paths T10 and T11 as an example of switchback paths. The first cover 21 forms the reverse paths T10 and T11. According to this configuration, since the transport path T has the reverse paths T10 and T11 serving as the switchback path, the medium M can be reversed. For example, when the medium-transport apparatus is the multifunction machine 11 with a recording function, double-sided recording can be performed on the medium M. Since the first cover 21 has the reverse paths T10 and T11, the reverse paths T10 and T11 can be readily exposed by opening the first cover 21. Therefore, the jam removal operation can be readily performed during double-sided recording. The first cover 21 that forms the reverse paths T10 and T11 becomes heavy. When the first cover 21 becomes heavy, the first cover is likely to hang down when opened. However, the first cover 21 is less likely to come into contact with the second cover 22 when the both covers 21 and 22 are opened, due to how the first and second covers 21 and 22 are opened.

15. The dimension LY1 in the Y-axis direction of the first cover 21 is equal to the dimension LY2 in the Y-axis direction of the second cover 22. The side edge 21S extending in the Z-axis direction of the first cover 21 and the side edge 22S extending in the Z-axis direction of the second cover 22 are on a straight line in the Z-axis direction. According to this configuration, the side edges 21S and 22S of the first and second covers 21 and 22 are aligned, contributing to good appearance.

16. The multifunction machine 11 is provided with the cassette cover 20K on the side surface 12F (front) facing the Y-axis direction, as an example of the fourth cover that can be opened and closed with respect to the apparatus main body 12. The side edge 20S of the cassette cover 20K forms the gap G with at least one of the side edge 21S of the first cover 21 and the side edge 22S of the second cover 22. According to this configuration, since the side edge 20S of the cassette cover 20K forms the gap G with at least one of the first cover 21 and the second cover 22, the number of gaps adjacent to the side edge 20S of the cassette cover 20K can be reduced. Therefore, the appearance of the multifunction machine 11 can be improved when viewed from the side where the cassette cover 20K faces. For example, when there is a portion (for example, a crosspiece) constituting the housing 12A at a position adjacent to the side edge 20S of the cassette 20, a gap is formed in an area around the cassette 20 when viewed from the front. On the other hand, in the multifunction machine 11, the gap G is hidden behind the side edge 20S of the cassette 20 when viewed from the front. Thus, the appearance can be improved when viewed from the front.

17. The direction in which the side surface 12F on which the cassette cover 20K is provided faces is the same as the direction in which the operation panel 19 of the multifunction machine 11 faces. The gap G opens in the X-axis direction. According to this configuration, the multifunction machine 11 looks good since the gap G does not face the front of the multifunction machine 11.

18. The cassette cover 20K is provided for the cassette 20 that can be pulled out in the Y-axis direction, in which the medium M to be fed is mounted. According to this configuration, since the cassette 20 is frequently used by the user, the cassette cover 20K is frequently seen by the user. Such a cassette cover 20K covers a gap between the cassette 20 and the portion of the housing 12A of the multifunction machine 11 in which the cassette 20 is retractably accommodated. Therefore, the gap G cannot be seen when the cassette cover 20K is viewed from the front. Thus, the multifunction machine 11 looks good when viewed from the front where the user stands.

19. The multifunction machine 11 further includes the liquid ejecting head 30A that ejects a liquid onto the medium M. The liquid ejecting head 30A is provided in the apparatus main body 12. According to this configuration, since the liquid ejecting head 30A is provided in the apparatus main body 12, rather than on the cover CV, the meniscus of the nozzle of the liquid ejecting head 30A can be prevented from being broken by the impact of opening and closing the cover CV.

20. According to the recording system 10 as an example of the medium-transport system, the advantageous effects of 1. to 19. described above can be similarly achieved.

Note that the above embodiment can be changed to modified examples described below. Furthermore, any combination of the above embodiment and the following modified examples or any combination of the following modified examples may also be conceived as a further modified example.

Figure 12:
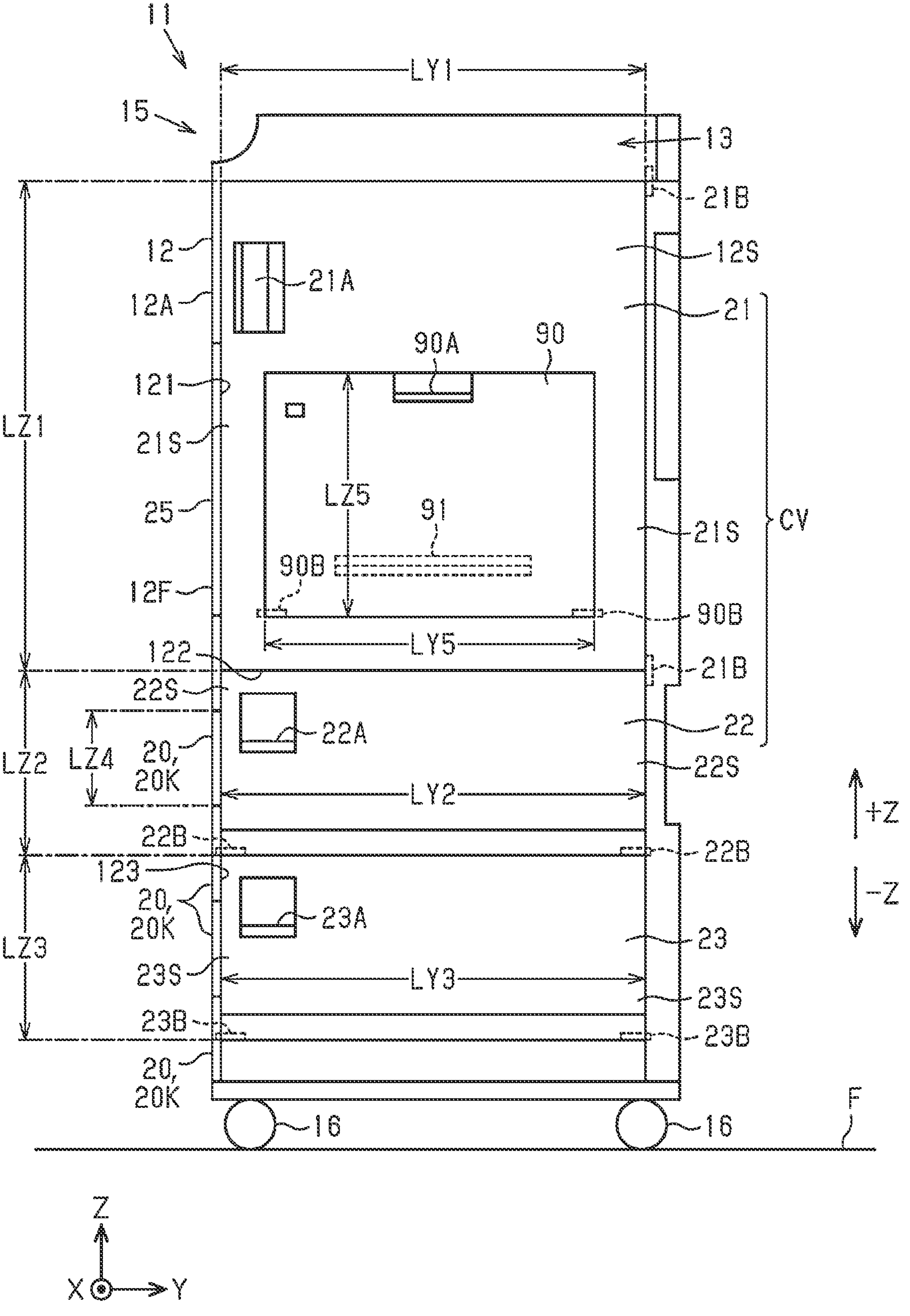
FIG. 12 is a partial side view showing a multifunction machine in a modified example.

The tray of the first cover 21 may be a discharge tray. For example, as shown in FIG. 12, the first cover 21 has a discharge tray 90 as an example of a tray on which the medium M is mounted. The multifunction machine 11 includes a discharge roller 91 that discharges the medium M from the transport path T to the discharge tray 90. The discharge tray 90 has a rotation shaft 90B along the Y-axis and is configured to be rotatable with respect to the first cover 21. The discharge tray 90 has a handle 90A. Therefore, the discharge tray 90 can be expanded and stored by rotation.

Since the first cover 21 has the discharge tray 90, the first cover 21 is likely to hang down in the −Z direction. Since the position of the large-capacity paper feed unit 80 in the Z-axis direction does not overlap the first cover 21, the discharge tray 90 does not collide with the large-capacity paper feed unit 80 when the discharge tray 90 is opened. That is, the large-capacity paper feed unit 80 does not need to be moved in the X-axis direction in order to open the discharge tray 90. The large-capacity paper feed unit 80 may be at the same height as the second cover 22. In this case, again, the discharge tray 90 does not collide with the large-capacity paper feed unit 80 when the discharge tray 90 is opened. Since the first cover 21 has the discharge tray 90, various types of media M (for example, media M that differ in thickness and basis weight) can be discharged from the transport path T. The medium M jammed in the discharge roller 91 can be readily removed by opening the first cover 21. The first cover 21 may include both the feed tray 24 and the discharge tray 90 as an example of the tray.

The third cover 23 may be eliminated. In this case, the dimension in the Z-axis direction of the second cover 22 may be larger than that in the above embodiment. For example, in the above embodiment, one cover of the area occupied by the second and third covers 22 and 23 may be used as the second cover 22.

The third cover is not limited to the rotary type having a rotation shaft, but may be a removable cover that can be attached to and removed from the apparatus main body 12.

The third cover is not limited to the configuration that covers the transport path, but may be a cover that covers components other than the transport paths in the apparatus main body 12. The components may include a waste liquid tank or the like.

The lower end of the first cover 21 in the Z-axis direction may be lower than the upper end of the large-capacity paper feed unit 80 in the Z-axis direction.

The first cover 21 may be configured to include no tray.

The feeding device is not limited to the large-capacity paper feed unit 80, but may be an intermediate device that transports a medium M carried in from outside along an internal transport path T and discharges the medium to the medium-transport apparatus. The intermediate device as an example of this type of feeding device may be a device that transports a recorded medium M for drying, or may be a device that includes a reverse path for reversing the direction of the recorded medium as the transport path.

The side surface of the apparatus main body 12 where the cover CV is provided may be the opposite side surface (the left side surface when viewed from the front), which is opposite to that of the above embodiment, of the two side surfaces facing the X-axis direction. Alternatively, the side surface of the apparatus main body 12 where the cover CV is provided may be the front or back surface.

The cassette cover 20K as an example of the fourth cover may be fixed to the end portion of the cassette 20 on the pull-out direction side, or may be a rotating body that has a rotation shaft along the X-axis direction and is provided so as to be rotatable with respect to the apparatus main body 12. In the latter case, the fourth cover covers the cassette 20 in its closed state, and the cassette 20 is retractably exposed by opening the fourth cover.

The cassette cover 20K as an example of the fourth cover may be provided on a side surface other than the front surface of the apparatus main body 12. That is, the direction in which the side surface on which the cassette cover 20K is provided faces does not have to be the same as the direction in which the operation panel 19 of the multifunction machine 11 faces. For example, the cassette cover 20K may be provided on the same side surface as the first cover 21, or may be provided on the side surface opposite to the side surface 12S on which the first cover 21 is provided.

The fourth cover is not limited to the cassette cover 20K but may be a rotating body that exposes a tank or a cartridge that stores a liquid or the like to be ejected onto the medium M. The fourth cover may be a rotating body (cover) having a rotation shaft along the X-axis direction.

A multifunction machine 11 including two stages, instead of four stages, of cassettes 20 may be configured such that the lower end on the −Z side of the first cover 21 is closer to the +Z side than the upper end on the +Z side of the large-capacity paper feed unit 80 as an example of the feeding device. The number of stages of the cassettes 20 when this condition is satisfied may be three or five.

Instead of the second cover 22, the third cover 23 may be configured to include a carry-in port 66 through which the medium M transported from the large-capacity paper feed unit 80 as an example of the feeding device passes.

The third cover 23 may have a rotation shaft along the Z-axis and may be rotatable with respect to the apparatus main body 12.

The medium M is not limited to single-cut paper but may be roll paper. The medium M is not limited to paper but may be a sheet or film made of plastic, metal, laminate, or ceramic. The medium M may be a cloth (including a woven fabric, a non-woven fabric, and a knitted fabric).

The medium-transport apparatus may be a multifunction machine 11 or a printer with no cassette 20. For example, the medium-transport apparatus may be configured to be always used as a recording system having the medium M fed from an external device such as the large-capacity paper feed unit 80.

The medium-transport apparatus is not limited to the multifunction machine 11. The medium-transport apparatus may be a printer that does not include the image reader 13 and the automatic document feeder 14.

The medium-transport apparatus is not limited to a multifunction machine or a printer but may be any device that has a transport path for transporting a medium. The medium-transport apparatus may also be configured to include no recording unit. That is, the medium-transport apparatus may be any device including a processing unit that performs predetermined processing including recording or processing other than recording on the medium. The medium-transport apparatus may be an apparatus that includes a processing unit that performs processing on the medium and also includes a transport path that transports the medium through a path that passes a processing position where the processing unit performs the processing. For example, the medium-transport apparatus may be an image reading apparatus including a reader as a processing unit that performs rea processing to read an image on a document. The processing unit may be a processing unit that ejects or applies a processing liquid onto the medium. The processing unit may be a drying unit that performs dry processing to dry the medium. Examples of the drying unit include a blower or a heater.

The technical ideas and advantageous effects thereof that can be grasped from the above-mentioned embodiment and modified examples will be described below.

(A) As for the Z-axis orthogonal to the installation surface of a medium-transport apparatus, the medium-transport apparatus side is the +Z side and the opposite side is the −Z side with respect to the installation surface. Also, two axes orthogonal to each other in the in-plane directions of the installation surface are the X-axis and Y-axis, respectively. The multifunction machine includes: the apparatus main body having the transport path for transporting the medium; and the cover provided on the side surface of the apparatus main body and configured to be switched between a first state of exposing the transport path and a second state of covering the transport path. The cover is divided into: the first cover that has the rotation shaft along the Z-axis and is rotatable with respect to the apparatus main body; and the second cover that is arranged on the −Z side of the first cover, has the rotation shaft along the Y-axis on the Z-side, and is rotatable with respect to the apparatus main body.

According to this configuration, since the cover is divided into the first and second covers, the transport path that extends over the first and second covers is continuously opened by opening the first and second covers. Therefore, good workability is achieved. Even when the first cover is likely to hang down on the −Z side under its own weight, the hanging first cover is less likely to collide with the second cover since the rotation shaft of the second cover arranged on the −Z side is arranged along the Y-axis on the −Z side. Thus, good opening/closing operation can be ensured. Therefore, good workability when the cover is opened and good opening/closing operation of the cover can be both achieved.

(B) Preferably, in the above-described medium-transport apparatus, the apparatus main body is configured such that the medium can be fed from the feeding device which is arranged in the X-axis direction with respect to the apparatus main body, accommodates the medium, and feeds the medium that is accommodated to the transport path. The lower end of the first cover on the −Z side is closer to the +Z side than the upper end of the feeding device on the +Z side.

According to this configuration, the lower end of the first cover on the −Z side is closer to the +Z side than the upper end of the feeding device on the +Z side. Thus, the first cover when opened does not collide with the feeding device. Therefore, good workability is achieved even when the medium is fed from the feeding device to the transport path.

(C) Preferably, in the above-described medium-transport apparatus, the position of the feeding device in the Z-axis direction overlaps the position of the second cover in the Z-axis direction, and the feeding device is configured to move in the X-axis direction with respect to the apparatus main body. The dimension in the Y-axis direction of the first cover is larger than the dimension in the Z-axis direction of the second cover.

According to this configuration, the amount of movement of the feeding device can be reduced when opening the second cover. Therefore, the installation area (installation area of the medium-transport system) required for jam removal can be reduced.

(D) Preferably, in the above-described medium-transport apparatus, the second cover includes the carry-in port through which the medium transported from the feeding device passes.

According to this configuration, the feeding device does not get in the way when opening/closing the first cover, as compared with the configuration in which the carry-in port is provided in the first cover.

(E) Preferably, in the above-described medium-transport apparatus, the multifunction machine further includes the third cover that is arranged on the −Z side of the cover, has the rotation shaft along the Y-axis orthogonal to the Z-axis on the −Z side, and is configured to rotate with respect to the apparatus main body. The dimension in the Y-axis direction of the third cover is larger than the dimension in the Z-axis direction of the third cover.

According to this configuration, the space required for opening the third cover in the X-axis direction can be reduced. Therefore, the distance for which the feeding device is moved to open the third cover can be shortened.

(F) Preferably, in the above-described medium-transport apparatus, the dimension in the Y-axis direction of the first cover is smaller than the dimension in the Z-axis direction of the first cover.

According to this configuration, since the rotation shaft of the first cover is along the Z-axis which is the longitudinal direction of the first cover, the space in the X-axis direction required to open the first cover is reduced. At the same time, more transport paths can be exposed when the first cover is opened.

(G) Preferably, in the above-described medium-transport apparatus, the dimension in the Y-axis direction of the second cover is larger than the dimension in the Z-axis direction of the second cover.

According to this configuration, since the rotation shaft of the second cover is along the Y-axis which is the longitudinal direction of the second cover, the space in the X-axis direction required to open the second cover is reduced. At the same time, more transport paths can be exposed when the second cover is opened.

(H) Preferably, in the above-described medium-transport apparatus, the dimension in the Z-axis direction of the second cover is smaller than the dimension in the Z-axis direction of the first cover.

According to this configuration, the space in the X-axis direction when the second cover is opened can be reduced. Also, different member such a tray can be readily arranged on the first cover.

(I) Preferably, in the above-described medium-transport apparatus, the first cover has the feed tray.

According to this configuration, since the first cover has the tray, various types of media (for example, media that differ in thickness and basis weight) can be fed to the transport path and discharged from the transport path.

(J) Preferably, in the above-described medium-transport apparatus, the first cover includes the feed roller that feeds the medium mounted on the tray to the transport path or the discharge roller that discharges the medium from the transport path to the tray.

According to this configuration, the medium jammed in the feed roller or discharge roller can be readily removed by opening the first cover.

(K) Preferably, in the above-described medium-transport apparatus, the has the rotation shaft along the Y-axis and is configured to be rotatable with respect to the first cover.

According to this configuration, the can be expanded and stored by rotation.

(L) Preferably, in the above-described medium-transport apparatus, the multifunction machine further includes the cassette having a plurality of media mounted therein. The position of the second cover in the Z-axis direction overlaps the position of the cassette in the Z-axis direction. The first cover is located at a position where the position in the Z-axis direction does not overlap the position of the cassette in the Z-axis direction, and covers the transport paths downstream of the transport paths covered by the second cover.

According to this configuration, the transport path near the cassette is a place where jam removal operations are frequently performed due to multiple feeding or the like.

Only this place can be opened by the second cover. Therefore, good workability is achieved during the jam removal operation.

(M) Preferably, in the above-described medium-transport apparatus, the first cover is heavier than the second cover.

According to this configuration, when the first and second covers are both opened, the first cover is likely to hang down under its own weight, but the second cover is located below the first cover at a distance due to how the both covers are opened. Therefore, the first cover is less likely to come into contact with the second cover.

(N) Preferably, in the above-described medium-transport apparatus, the transport path has switchback paths. The first cover forms the switchback paths.

According to this configuration, since the transport path has the switchback path, the medium can be reversed. For example, when the medium-transport apparatus has a recording function, double-sided recording can be performed on the medium. Since the first cover has the switchback paths, the switchback paths can be readily exposed by opening the first cover. Therefore, the jam removal operation can be readily performed during double-sided recording. The first cover that forms the switchback paths becomes heavy. When the first cover becomes heavy, the first cover is likely to hang down when opened.
However, the first cover is less likely to come into contact with the second cover when the both covers are opened, due to how the first and second covers are opened.

(O) Preferably, in the above-described medium-transport apparatus, the dimension in the Y-axis direction of the first cover is equal to the dimension in the Y-axis direction of the second cover. The side edge extending in the Z-axis direction of the first cover and the side edge extending in the Z-axis direction of the second cover are on a straight line in the Z-axis direction.

According to this configuration, the side edges of the first and second covers are aligned, thus contributing to good appearance.

(P) In the medium-transport apparatus, a fourth cover that can be opened and closed with respect to the apparatus main body may be provided on a side surface facing the Y-axis direction, and the fourth cover may have a side edge that forms a gap with at least one of the side edges of the first and second covers.

According to this configuration, since the side edge of the fourth cover forms a gap with at least one of the first and second covers, the number of gaps adjacent to the edge of the fourth cover can be reduced. Therefore, the medium-transport apparatus looks good when viewed from the side facing the fourth cover.

(Q) Preferably, in the above-described medium-transport apparatus, the direction in which the side surface having the fourth cover provided thereon faces is the same as the direction in which the operation panel of the medium-transport apparatus faces, and the gap opens in the X-axis direction.

According to this configuration, the medium-transport apparatus looks good since the gap does not face the so-called front.

(R) Preferably, in the above-described medium-transport apparatus, the fourth cover is a cassette that can be pulled out in the Y-axis direction, and is provided on the cassette in which the medium to be fed is mounted.

According to this configuration, since the cassette is frequently used by the user, the fourth cover is frequently seen by the user. Such a fourth cover covers a gap between the cassette and a housing in which the cassette is retractably housed. Therefore, when the fourth cover is viewed from the front, the gap is hidden behind the fourth cover and cannot be seen. Accordingly, the medium-transport apparatus looks good when viewed with the side surface provided with the fourth cover as the front.

(S) Preferably, in the above-described medium-transport apparatus, the multifunction machine further includes the liquid ejecting head that ejects a liquid onto the medium. The liquid ejecting head is provided in the apparatus main body.

According to this configuration, since the liquid ejecting head is provided in the apparatus main body, rather than on the cover, the meniscus of the nozzle of the liquid ejecting head can be prevented from being broken by the impact of opening and closing the cover.

(T) A medium-transport system includes a medium-transport apparatus, and a feeding device that feeds a medium to the medium-transport apparatus. The medium-transport apparatus in which a Z-axis orthogonal to an installation surface of the medium-transport apparatus has a +Z side set on a side of the medium-transport apparatus and a −Z side set on the opposite side with respect to the installation surface, and two axes orthogonal to each other in in-plane directions of the installation surface are an X-axis and a Y-axis, includes an apparatus main body having a transport path that transports a medium and a cover provided on a side surface of the apparatus main body and configured to be switched between a first state for exposing the transport path and a second state for covering the transport path. The cover is divided into a first cover that has a rotation shaft along the Z-axis and is configured to rotate with respect to the apparatus main body, and a second cover that is arranged on the −Z side of the first cover, has a rotation shaft along the Y-axis on the −Z side, and is configured to rotate with respect to the apparatus main body. The feeding device is arranged in the X-axis direction with respect to the apparatus main body of the medium-transport apparatus, accommodates the medium, and is configured to feed the medium that is accommodated to the transport path. The medium-transport apparatus is configured such that the medium is fed from the feeding device. A lower end of the first cover on the −Z side is closer to the +Z side than an upper end of the feeding device on the +Z side.

According to this configuration, good workability when the cover of the medium-transport apparatus is opened and good opening/closing operation of the cover can be both achieved.

What is claimed is:

1. A medium-transport apparatus in which a Z-axis orthogonal to an installation surface of the medium-transport apparatus has a +Z side set on a side of the medium-transport apparatus and a −Z side set on an opposite side with respect to the installation surface, and two axes orthogonal to each other in in-plane directions of the installation surface are an X-axis and a Y-axis, the apparatus comprising:

an apparatus main body having a transport path that transports a medium; and a cover provided on a side surface of the apparatus main body and configured to be switched between a first state for exposing the transport path and a second state for covering the transport path, wherein the cover is divided into a first cover that has a rotation shaft along the Z-axis and is configured to rotate with respect to the apparatus main body, a second cover that is arranged on the −Z side of the first cover, has a rotation shaft along the Y-axis on the −Z side, and is configured to rotate with respect to the apparatus main body, the apparatus main body is configured such that the medium is fed from a feeding device which is arranged in an X-axis direction with respect to the apparatus main body, accommodates the medium, and feeds the medium that is accommodated to the transport path, and a lower end of the first cover on the −Z side is closer to the +Z side than an upper end of the feeding device on the +Z side.

2. The medium-transport apparatus according to claim 1, wherein a position of the feeding device in a Z-axis direction overlaps a position of the second cover in the Z-axis direction, and the feeding device is configured to move in the X-axis direction with respect to the apparatus main body, and a dimension in a Y-axis direction of the first cover is larger than a dimension in the Z-axis direction of the second cover.

3. The medium-transport apparatus according to claim 1, wherein the second cover includes a carry-in port through which the medium transported from the feeding device passes.

4. The medium-transport apparatus according to claim 1, further comprising:

a third cover that is arranged on the −Z side of the cover, has a rotation shaft along the Y-axis orthogonal to the Z-axis on the −Z side, and is configured to rotate with respect to the apparatus main body, wherein a dimension in a Y-axis direction of the third cover is larger than a dimension in a Z-axis direction of the third cover.

5. The medium-transport apparatus according to claim 1, wherein a dimension in a Y-axis direction of the second cover is larger than a dimension in a Z-axis direction of the second cover.

6. The medium-transport apparatus according to claim 1, further comprising:

a cassette having a plurality of media mounted therein, wherein a position of the second cover in a Z-axis direction overlaps a position of the cassette in the Z-axis direction, and a position of the first cover in the Z-axis direction does not overlap the position of the cassette in the Z-axis direction, and the first cover covers the transport path downstream of the transport path covered by the second cover.

7. The medium-transport apparatus according to claim 1, wherein the first cover is heavier than the second cover.

8. The medium-transport apparatus according to claim 1, wherein the transport path has a switchback path, and the first cover forms the switchback path.

9. The medium-transport apparatus according to claim 1, wherein a dimension in a Y-axis direction of the first cover is equal to a dimension in the Y-axis direction of the second cover, and a side edge extending in a Z-axis direction of the first cover and a side edge extending in the Z-axis direction of the second cover are on a straight line in the Z-axis direction.

10. The medium-transport apparatus according to claim 1, further comprising:

a liquid ejecting head that ejects a liquid onto the medium, wherein the liquid ejecting head is provided in the apparatus main body.

11. A medium-transport apparatus in which a Z-axis orthogonal to an installation surface of the medium-transport apparatus has a +Z side set on a side of the medium-transport apparatus and a −Z side set on an opposite side with respect to the installation surface, and two axes orthogonal to each other in in-plane directions of the installation surface are an X-axis and a Y-axis, the apparatus comprising:

an apparatus main body having a transport path that transports a medium; and a cover provided on a side surface of the apparatus main body and configured to be switched between a first state for exposing the transport path and a second state for covering the transport path, wherein the cover is divided into a first cover that has a rotation shaft along the Z-axis and is configured to rotate with respect to the apparatus main body, a second cover that is arranged on the −Z side of the first cover, has a rotation shaft along the Y-axis on the −Z side, and is configured to rotate with respect to the apparatus main body, and a dimension in a Y-axis direction of the first cover is smaller than a dimension in a Z-axis direction of the first cover.

12. The medium-transport apparatus according to claim 11, wherein a dimension in a Y-axis direction of the second cover is larger than a dimension in a Z-axis direction of the second cover.

13. The medium-transport apparatus according to claim 11, further comprising:

a cassette having a plurality of media mounted therein, wherein a position of the second cover in a Z-axis direction overlaps a position of the cassette in the Z-axis direction, and a position of the first cover in the Z-axis direction does not overlap the position of the cassette in the Z-axis direction, and the first cover covers the transport path downstream of the transport path covered by the second cover.

14. The medium-transport apparatus according to claim 11, wherein the first cover is heavier than the second cover.

15. The medium-transport apparatus according to claim 11, wherein the transport path has a switchback path, and the first cover forms the switchback path.

16. The medium-transport apparatus according to claim 11, wherein a dimension in a Y-axis direction of the first cover is equal to a dimension in the Y-axis direction of the second cover, and a side edge extending in a Z-axis direction of the first cover and a side edge extending in the Z-axis direction of the second cover are on a straight line in the Z-axis direction.

17. The medium-transport apparatus according to claim 11, further comprising:

a liquid ejecting head that ejects a liquid onto the medium, wherein the liquid ejecting head is provided in the apparatus main body.

18. A medium-transport system comprising:

a medium-transport apparatus; and a feeding device that feeds a medium to the medium-transport apparatus, wherein the medium-transport apparatus in which a Z-axis orthogonal to an installation surface of the medium-transport apparatus has a +Z side set on a side of the medium-transport apparatus and a −Z side set on an opposite side with respect to the installation surface, and two axes orthogonal to each other in in-plane directions of the installation surface are an X-axis and a Y-axis, includes an apparatus main body having a transport path that transports a medium and a cover provided on a side surface of the apparatus main body and configured to be switched between a first state for exposing the transport path and a second state for covering the transport path, the cover is divided into a first cover that has a rotation shaft along the Z-axis and is configured to rotate with respect to the apparatus main body, and a second cover that is arranged on the −Z side of the first cover, has a rotation shaft along the Y-axis on the −Z side, and is configured to rotate with respect to the apparatus main body, the feeding device is arranged in an X-axis direction with respect to the apparatus main body of the medium-transport apparatus, accommodates the medium, and is configured to feed the medium that is accommodated to the transport path, the medium-transport apparatus is configured such that the medium is fed from the feeding device, and a lower end of the first cover on the −Z side is closer to the +Z side than an upper end of the feeding device on the +Z side.

* * * * *